United States Patent
Blaber et al.

(10) Patent No.: US 12,495,971 B2
(45) Date of Patent: Dec. 16, 2025

(54) FLOW MEASUREMENT THROUGH OCT

(71) Applicant: LightLab Imaging, Inc., Westford, MA (US)

(72) Inventors: Justin Akira Blaber, Lowell, MA (US); Ajay Gopinath, Bedford, MA (US); Wei Chiu, Stony Brook, NY (US)

(73) Assignee: LightLab Imaging, Inc., Westford, MA (US)

( * ) Notice: Subject to any disclaimer, the term of this patent is extended or adjusted under 35 U.S.C. 154(b) by 19 days.

(21) Appl. No.: 18/267,670

(22) PCT Filed: Dec. 17, 2021

(86) PCT No.: PCT/US2021/064011
§ 371 (c)(1),
(2) Date: Jun. 15, 2023

(87) PCT Pub. No.: WO2022/133200
PCT Pub. Date: Jun. 23, 2022

(65) Prior Publication Data
US 2024/0099585 A1    Mar. 28, 2024

Related U.S. Application Data

(60) Provisional application No. 63/127,615, filed on Dec. 18, 2020.

(51) Int. Cl.
*A61B 5/00* (2006.01)
*A61B 5/026* (2006.01)
*A61B 5/107* (2006.01)

(52) U.S. Cl.
CPC .......... *A61B 5/0066* (2013.01); *A61B 5/0261* (2013.01); *A61B 5/1076* (2013.01)

(58) Field of Classification Search
CPC ... A61B 5/1076; A61B 5/0028; A61B 5/0215; A61B 8/0891; A61B 8/12
See application file for complete search history.

(56) References Cited

U.S. PATENT DOCUMENTS 5,150,292 A * 9/1992 Hoffmann .............. A61B 6/507
600/431
6,351,663 B1 * 2/2002 Flower ............... A61K 49/0034
600/431

(Continued)

FOREIGN PATENT DOCUMENTS

| | | |
|---|---|---|
| JP | 2007517637 A | 7/2007 |
| WO | 2019/204573 A1 | 10/2019 |
| WO | 2020/165226 A1 | 8/2020 |

OTHER PUBLICATIONS

"Mean Value Theorem Integral vs Average Value", https://www.youtube.com/watch?v=KxPo0Ot0wR4, Duran Learning 2017, transcripts (Year: 2017).*

(Continued)

*Primary Examiner* — Oommen Jacob
(74) *Attorney, Agent, or Firm* — Lerner David LLP

(57) ABSTRACT

The present disclosure provides systems and methods for determining a mean transit time of a bolus within the blood vessel by passing the bolus through the blood vessel while an intravascular imaging probe is held stationary. The probe may collect a plurality of image frames as the bolus passes the probe. The cross-sectional area of the bolus within the images frames may be determined by segmenting each image frame by thresholding, creating a vessel mask, and creating a contrast mask by applying an element-wise AND operator to the thresholded image and the vessel mask. The cross-sectional area of the bolus for the image frames may be plotted on an area dilution curve. Various fits may be applied to and various points may be identified on the area (Continued)

dilution curve. The various fits and points may be used to determine the mean transit time.

14 Claims, 12 Drawing Sheets

(56) References Cited

U.S. PATENT DOCUMENTS

| | | | | |
|---|---|---|---|---|
| 6,394,961 | B1* | 5/2002 | Pfeiffer | A61B 5/028 600/549 |
| 7,069,068 | B1* | 6/2006 | Ostergaard | A61B 5/055 600/407 |
| 11,109,766 | B2 | 9/2021 | Wilson et al. | |
| 2003/0097076 | A1* | 5/2003 | Nambu | A61B 6/504 600/504 |
| 2006/0058622 | A1* | 3/2006 | Tearney | A61B 5/0084 600/407 |
| 2008/0281205 | A1 | 11/2008 | Naghavi et al. | |
| 2014/0039320 | A1* | 2/2014 | Jespersen | A61B 8/481 600/458 |
| 2014/0086461 | A1* | 3/2014 | Yao | A61B 6/541 382/128 |
| 2017/0032097 | A1* | 2/2017 | Itu | G16H 50/50 |
| 2021/0113101 | A1* | 4/2021 | Bouma | A61B 5/0275 |
| 2024/0099585 | A1* | 3/2024 | Blaber | A61B 5/0066 |

OTHER PUBLICATIONS

"How to find the average value of a function with integration" https://www.youtube.com/watch?v=jSI5BVwxxuE, Brian McLogan, 2017 (Year: 2017).*

Xaplanteris Panagiotis et al.: "Catheter-based functional metrics of the coronary circulation," Journal of Nuclear Cardiology, Mosby, St. Louis, MO, US, vol. 24, No. 4, Sep. 7, 2016 (Sep. 7, 2016), pp. 1178-1189, XP036294716, ISSN: 1071-3581, DOI: 10.1007/S12350-016-0652-7 [retrieved on Sep. 7, 2016] p. 1178-p. 1186.

Ford, Thomas, et al.: "Rationale and Design of the British Heart Foundation (BHF) Coronary Microvascular Angina (CorMicA) Stratified Medicine Clinical Trial," American Heart Journal, Elsevier, Amsterdam, NL, vol. 201, Apr. 3, 2018 (Apr. 3, 2018), pp. 86-94, XP085407255, ISSN: 002-8703, DOI: 10.1016/J.AHJ.2018.03.010 p. 87-p. 93.

International Search Report and Written Opinion issued in Appn. No. PCT/US2021/064011 mailed Apr. 29, 2022 (17 pages).

Yoon, Ha Yun Anna, "Measuring Coronary Artery Flow Rates using Intravascular Optical Coherence Tomography to Improve the Assessment of Percutaneous Coronary Intervention", Massachusetts Institute of Technology, Jun. 2019, pp. 1-33.

Merkle, C, et al., "Laminar microvascular transit time distribution in the mouse somatosensory cortex revealed by Dynamic Contrast Optical Coherence Tomography", Elsevier, NeuroImage, Oct. 20, 2015, pp. 350-362, vol. 125.

El Merhi, F. et al., "State of the art of coronary computed tomography angiography", Elsevier, Radiography, Nov. 6, 2019, pp. 174-182, vol. 26.

Office Action for Chinese Application No. 202180084992.9 dated Jul. 5, 2025. 6 pgs.

Office Action for European Application No. 21857021.6 dated Aug. 14, 2025.

Notice of Reasons for Refusal for Japanese Application No. 2023-537059 dated Oct. 31, 2025. 5 pgs.

* cited by examiner

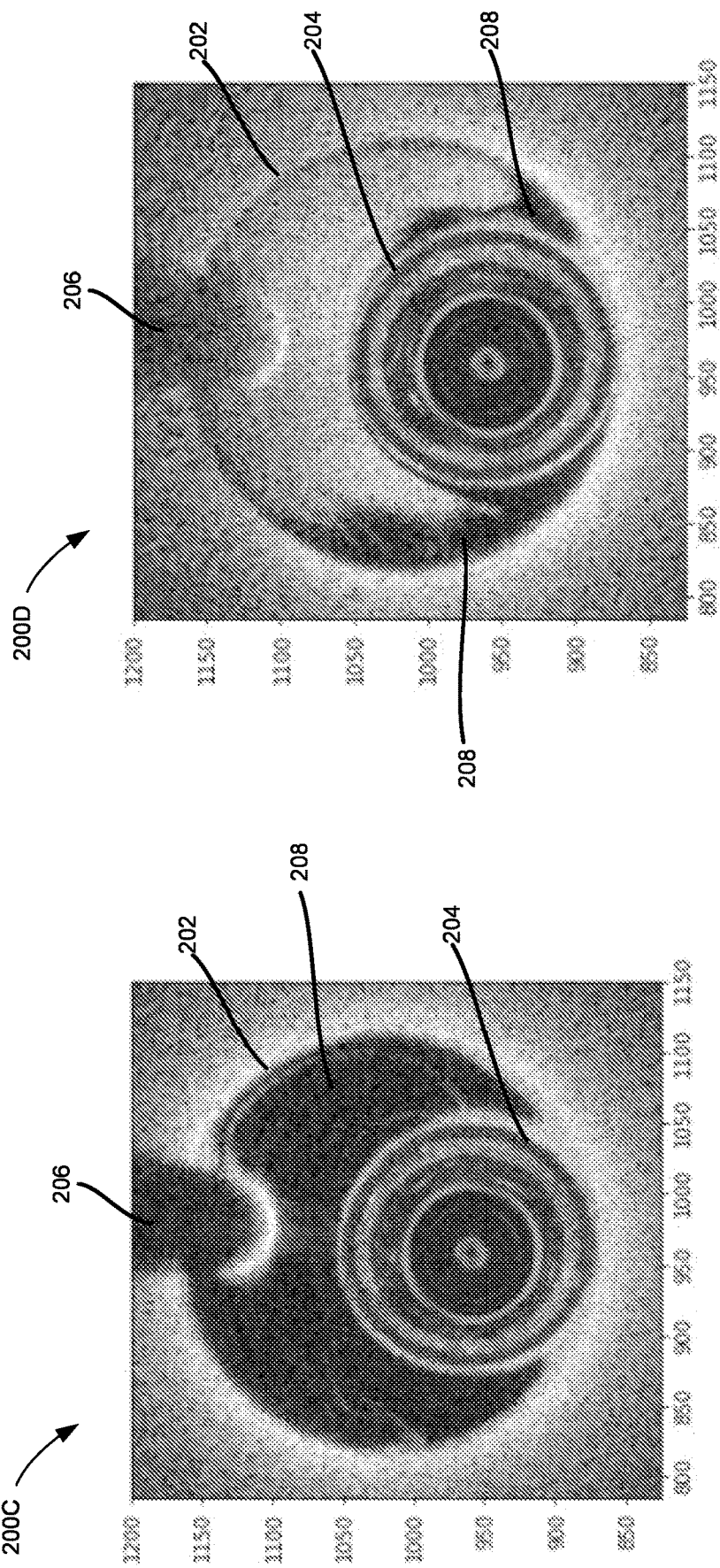

FLOW MEASUREMENT THROUGH OCT

CROSS-REFERENCE TO RELATED APPLICATIONS

This application is a national phase entry under 35 U.S.C. § 371 of International Application No. PCT/US2021/064011, filed Dec. 17, 2021, which claims the benefit of the filing date of U.S. Provisional Application No. 63/127,615, filed Dec. 18, 2020, entitled Flow Measurement Through OCT, the disclosures of which are hereby incorporated herein by reference.

BACKGROUND

Identifying microvascular resistance in a patient may require one or more data collection systems. For example, a physician may use a pressure wire, angiography, intravascular imaging, etc. to collect data to identify microvascular disease. Angiography may provide an insight as to what is happening within an entire heart while a pressure wire may be able to provide certain data measurements within a blood vessel.

Mean transit time, corresponding to the flow rate of blood in a blood vessel, is computed by passing a bolus of chilled saline through a blood vessel. The temperature of the bolus is measured as the bolus passes by a proximal and distal temperature sensor on a pressure wire, which is inserted separate from an imaging catheter, such as an optical coherence tomography ("OCT") catheter. A thermodilution curve is then plotted based on the temperature of the bolus as it passes the temperature sensors, providing an indication of the flow rate and, therefore, the mean transit time. This, however, requires additional steps and instruments which can be cumbersome and dangerous in practice.

BRIEF SUMMARY

The disclosure is generally directed to systems and methods for determining the mean transit time using an intravascular imaging probe. For example, the intravascular imaging probe may be an OCT probe, an intravascular ultrasound ("IVUS") probe, micro-OCT probe, near infrared spectroscopy (NIRS) sensor, or any other device that can be used to image a blood vessel. The mean transit time may be the rate of flow within the blood vessel. In examples where an OCT probe is used, a bolus of lumen flush may be passed through the blood vessel. The lumen flush may be, for example, contrast medium. In examples where an IVUS probe is used, a medium that can be imaged by the IVUS probe may be passed through the blood vessel. For purposes of clarity, the examples described herein may refer to an OCT probe. However, the use of an OCT probe is merely one example and is not intended to be limiting.

During a pullback, the pullback of the OCT probe may be stopped such that the OCT probe is held stationary at a given location. When the OCT probe is held stationary, a plurality of image frames may be collected while the bolus of lumen flush passes by. The cross-sectional area of the bolus in one or more image frames may be determined. The cross-sectional area may be used to determine and/or create an area dilution curve. The area dilution curve may be used to determine the mean transit time within the blood vessel. In some examples, the area dilution curve may allow for other downstream flow indicators, such as coronary flow reserve ("CFR"), index of microcirculatory resistance ("IMR"), etc.

One aspect of the disclosure includes a method of determining a mean transit time of a bolus within a blood vessel comprising storing intravascular imaging data for a blood vessel in a memory device, the intravascular data comprising a plurality of image frames collected by one or more processors coupled to an intravascular imaging probe at a location within the blood vessel, determining, by the one or more processors based on the intravascular imaging data, a mean transit time of the bolus within the blood vessel. The method may further include determining, by the one or more processors based on the determined mean transit time, at least one of a coronary flow reserve ("CFR") value or an index of microcirculatory resistance ("IMR") value. The intravascular imaging data may be optical coherence tomography ("OCT") imaging data, intravascular ultrasound imaging data, micro-OCT imaging data, or near infrared spectroscopy imaging data.

Each of the plurality of frames may include a portion of a bolus injected into the blood. The method may further comprise determining, by the one or more processors, a cross-sectional area of the portion of the bolus in each of the plurality of image frames, and creating, by the one or more processors based on the determined cross-sectional area of the portion of the bolus in each of the plurality of image frames, a distribution curve. Determining the mean transit time of blood within the blood vessel may be further based on the distribution curve. Determining the mean transit time further may further include integrating, by the one or more processors, the distribution curve.

Determining the cross-sectional area of the portion of the bolus may include segmenting, by the one or more processors, each of the plurality of image frames by thresholding, determining, by the one or more processors, a vessel mask for each of the plurality of images frames, wherein the determining is based on at least one of a lumen offset, a catheter offset, or a guidewire offset, and determining, by the one or more processors based on each of the plurality of segmented image frames and the vessel mask for each of the plurality of image frames, a contrast mask. A pixel area of the contrast mask for each of the plurality of image frames may correspond to the cross-sectional area of the portion of the bolus. Segmenting each of the plurality of image frames by thresholding may include at least one of: computing, by the one or more processors, a Gaussian mixture model, comparing, by the one or more processors, each of the one or more image frames to a predetermined threshold, or applying, by the one or more processors, Otsu thresholding.

Another aspect of the disclosure includes a system comprising an intravascular imaging probe and one or more processors in communication with the intravascular imaging probe. The one or more processors may be configured to collect a plurality of intravascular image frames at a location within a blood vessel, determine, based on the plurality of intravascular image frames, a mean transit time of blood within the blood vessel, and determine, based on the determined mean transit time, at least one of a coronary flow reserve ("CFR") value or an index of microcirculatory resistance ("IMR") value.

Yet another aspect of the disclosure includes a non-transitory computer-readable medium storing instructions, which when executed by one or more processors, cause the one or more processors to receive a plurality of intravascular image frames at a location within a blood vessel from an intravascular imaging probe, determine, based on the intravascular image frames, a mean transit time of blood within the blood vessel, and determine, based on the determined mean transit time, at least one of a coronary flow reserve ("CFR") value or an index of microcirculatory resistance ("IMR") value.

One aspect of the disclosure includes a method comprising storing intravascular data for a blood vessel in a memory device, the intravascular data comprising a plurality of image frames collected by one or more processors coupled to an optical imaging probe at a location within the blood vessel, wherein each of the plurality of image frames includes a portion of a bolus injected into the blood vessel, determining, by the one or more processors, a cross-sectional area of the portion of the bolus in each of the plurality of image frames, creating, by the one or more processors based on the determined cross-sectional area of the portion of the bolus in each of the plurality of image frames, a distribution curve, and determining, by the one or more processors based on the distribution curve, a mean transit time of blood within the blood vessel.

Determining the cross-sectional area of the portion of the bolus may include segmenting, by the one or more processors, each of the plurality of image frames by thresholding, determining, by the one or more processors, a vessel mask for each of the plurality of images frames, wherein the determining is based on at least one of a lumen offset, a catheter offset, or a guidewire offset, and determining, by the one or more processors based on each of the plurality of segmented image frames and the vessel mask for each of the plurality of image frames, a contrast mask. A pixel area of the contrast mask for each of the plurality of image frames may correspond to the cross-sectional area of the portion of the bolus. Segmenting each of the plurality of image frames by thresholding may include at least one of: computing, by the one or more processors, a Gaussian mixture model, comparing, by the one or more processors, each of the one or more image frames to a predetermined threshold, or applying, by the one or more processors, Otsu thresholding.

The method may further comprise smoothing, by the one or more processors, the distribution curve using a median filter, determining, by the one or more processors, a peak of the smoothed distribution curve, applying, by the one or more processors to the smoothed distribution curve, a Gaussian fit, determining, by the one or more processors, a zero value four standard deviations outside of the Gaussian fit, and applying, by the one or more processors to the applied Gaussian fit based on the zero value, a log normal fit.

The method may further comprise determining, by the one or more processors, an initial time the bolus reached the optical imaging probe by identifying a first image frame of the plurality of image frames having at least a portion of the bolus. The initial time and the applied log normal fit may be used to determine the mean transit time. Determining mean transit time may further include integrating, by the one or more processors, the distribution curve.

Another aspect of the disclosure includes a system comprising an optical imaging probe and one or more processors in communication with the optical imaging probe. The one or more processors may be configured to collect a plurality of image frames at a location within a blood vessel, wherein each of the plurality of image frames includes a portion of a bolus injected into the blood vessel, determine a cross-sectional area of the portion of the bolus in each of the plurality of image frames, create, based on the determined cross-sectional area of the portion of the bolus in each of the plurality of image frames, a distribution curve, and determine, based on the distribution curve, a mean transit time of blood within the blood vessel.

Yet another aspect of the disclosure includes a non-transitory computer-readable medium storing instructions, which when executed by one or more processors, cause the one or more processors to receive a plurality of image frames at a location within a blood vessel from an optical imaging probe, wherein each of the plurality of image frames includes a portion of a bolus injected into the blood vessel, determine a cross-sectional area of the portion of the bolus in each of the plurality of image frames, create, based on the determined cross-sectional area of the portion of the bolus in each of the plurality of image frames, a distribution curve, and determine, based on the distribution curve, a mean transit time of blood within the blood vessel.

BRIEF DESCRIPTION OF THE DRAWINGS

FIGS. 2A-2F are example image frames taken by an OCT probe while held stationary in a blood vessel according to aspects of the disclosure.

DETAILED DESCRIPTION

The present disclosure provides for using a single intravascular imaging probe to identify and/or diagnose one or more aspects of microvascular disease within a blood vessel. By using a single intravascular imaging probe, the risk to the patient during the procedure and/or surgery may decrease as there may be less cuts, fewer instruments inserted into the patient, less time in the procedure/operating room, etc. In some examples, by using a single intravascular imaging probe, the efficiency of diagnosing the microvascular disease in a patient may increase because a physician is able to collect more data at once.

According to some examples, an intravascular imaging probe may be used to collect intravascular image data of a blood vessel. The intravascular image data may be used to determine the mean transit time of blood within the blood vessel. In some examples, the mean transit time may be determined at rest and/or at hyperemia. The mean transmit time determined from the intravascular image data may be used to determine coronary flow reserve ("CFR"), index of microcirculatory resistance ("IMR"), etc. The CFR and/or IMR values may be used to diagnose microvascular disease. According to some examples, the intravascular image data and/or any values determined using the intravascular image data may be used to evaluate a lesion within a blood vessel, evaluate potential stent placement, diagnose microvascular disease, etc.

An example use case may be when a physician may use an intravascular imaging probe to evaluate a lesion within a blood vessel. Simultaneously, or at substantially the same time, the physician may use the intravascular imaging probe to determine a mean transit time of a bolus within the vessel. The determined mean transmit time may be used to determine coronary flow reserve ("CFR"), index of microcirculatory resistance ("IMR"), etc. Thus, the single intravascular imaging probe may allow the physician to identify one or more aspects of microvascular disease within the blood vessel.

According to some examples, additional factors, combined with the determined CFR and/or IMR, may be used to identify one or more aspects of microvascular disease within the blood vessel. The additional factors may include, for example, the age, gender, body mass index ("BMI"), medical history, vessel type, vessel condition, treatment history, etc. of the patient. The medical history may include, for example, known heart failure, a previous diagnosis of diabetes, hypertension, etc. Vessel types may include the left anterior descending ("LAD") artery, left circumflex artery ("LCX"), right coronary artery ("RCA"), left marginal artery, diagonal arteries, right marginal artery, etc. Treatment history may include, for example, prior percutaneous coronary intervention ("PCI"), coronary artery bypass graft ("CABG"), etc.

Figure 11:
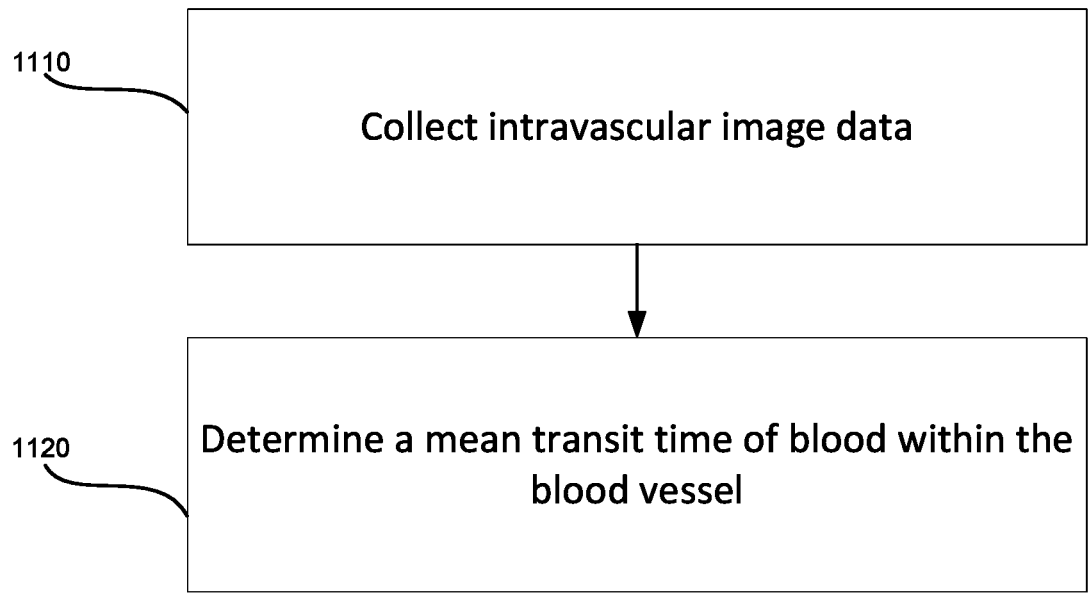
FIG. 11 is a flow diagram illustrating a method of determining microvascular resistance within a blood vessel according to aspects of the disclosure.

FIG. 11 illustrates an example method of determining a mean transit time of a bolus within a blood vessel. The following operations do not have to be performed in the precise order described below. Rather, various operations can be handled in a different order or simultaneously, and operations may be added or omitted.

In block 1110, a data collection system, such as system 100, may collect intravascular image data. The collected intravascular image data may be stored in memory 114. According to some examples, the intravascular image frames may be optical coherence tomography ("OCT") imaging data, intravascular ultrasound imaging data, micro-OCT imaging data, or near infrared spectroscopy imaging data. The intravascular image data may include one or more intravascular image frames. In some examples, the intravascular image data may be collected when an intravascular imaging probe is held stationary in a blood vessel.

According to some examples, the intravascular image data may include one or more intravascular image frames that include a portion of the bolus injected into the blood vessel. For example, one or more of the image frames may include a portion of the injected bolus as the bolus passes by the intravascular imaging probe.

In block 1120, a mean transit time of the bolus within the blood vessel may be determined based on the intravascular imaging data. According to some examples, the mean transit time of blood within the blood vessel may be determined by the method shown in FIG. 9 and discussed herein.

In some examples, determining the mean transit time of the bolus within the blood vessel may include determining a cross-sectional area of the portion of the bolus in each of the plurality of image frames. Determining the cross-sectional area of the portion of the bolus may include segmenting each of the plurality of image frames by thresholding. Segmenting each of the plurality of image frames by thresholding may include at least one of computing a Gaussian mixture model, comparing each of the one or more image frames to a predetermined threshold, or applying Otsu thresholding.

Additionally or alternatively, determining the cross-sectional area of the portion of the bolus may include determining a vessel mask for each of the plurality of image frames. The vessel mask may be based on at least one of a lumen offset, a catheter offset, or a guidewire offset. In some examples, determining the cross-sectional area of the portion of the bolus may include determining a contrast mask. The contrast mask may be based on each of the plurality of segmented image frames and/or the vessel mask for each of the plurality of image frames. According to some examples, a pixel area of the contrast mask for each of the plurality of image frames may correspond to the cross-sectional area of the portion of the bolus.

The cross-sectional area of the portion of the bolus in each of the plurality of image frames may be used to create a distribution. The distribution curve may be, for example, an area dilution curve. According to some examples, the distribution curve may be integrated to determine the mean transit time of the bolus.

According to some examples, at least one of a CFR value or an IMR may be determined based on the determined mean transit time. For example, the CFR value may be determined by dividing the determined mean transit time at rest by the mean transit time during hyperemia. The IMR value may be determined by multiplying the mean transit time at hyperemia by the distal pressure during hyperemia.

The determined CFR value and/or IMR may be used in conjunction with one or more patient factors when determining microvascular disease and potential treatments. For example, a physician may consider the patient's age, gender, BMI, medical history, the vessel type, the vessel condition, prior treatments, etc. in conjunction with the determined CFR and/or IMR value to determine if there is any microvascular disease and/or a potential treatment.

In one embodiment, microvascular resistance may be determined based on the determined mean transit time, the CFR value and/or the IMR value, and the age of the patient. For example, the age of the patient may be input and processed in conjunction with the CFR value and/or IMR value to determine the microvascular resistance of the blood vessel. According to some examples, one or more age specific parameters may be introduced based on training data. In some examples, the age specific parameters may be ranges of age to categorize the patient. The training data may be collected and used as input into a machine learning model. Based on the one or more age specific parameters as well as the mean transit time, the CFR value and/or the IMR value, the machine learning model may determine the microvascular resistance of the blood vessel.

In one embodiment, microvascular resistance may be determined based on the determined mean transit time, the CFR value and/or the IMR value, and the gender of the patient. For example, the gender of the patient may be input and processed in conjunction with the CFR value and/or IMR value to determine the microvascular resistance of the blood vessel. In some examples, the mean transit time, the CFR value, and/or the IMR value may be different based on the patient's gender. The patent's gender may be introduced based on training data. The training data may be collected and used as input into a machine learning model. Based on the patient's gender as well as the mean transit time, the CFR value and/or the IMR value, the machine learning model may determine the microvascular resistance of the blood vessel.

In one embodiment, microvascular resistance may be determined based on the determined mean transit time, the CFR value and/or the IMR value, and the BMI of the patient. For example, the BMI of the patient may be input and processed in conjunction with the CFR value and/or IMR value to determine the microvascular resistance of the blood vessel. According to some examples, one or more BMI parameters may be introduced based on training data. In some examples, the BMI parameters may be ranges of age to categorize the patient. The training data may be collected and used as input into a machine learning model. Based on the one or more BMI parameters as well as the mean transit time, the CFR value and/or the IMR value, the machine learning model may determine the microvascular resistance of the blood vessel.

In one embodiment, microvascular resistance may be determined based on the determined mean transit time, the CFR value and/or the IMR value, and the medical history of the patient. By way of example, medical history, such as known heart failure, of the patient may be input and processed in conjunction with the CFR value and/or IMR value to determine the microvascular resistance of the blood vessel. According to some examples, one or more condition specific parameters may be introduced based on training data. In some examples, the condition specific parameters may be based on the medical history of the patient. For example, the medical history of the patient may indicate a history of heart failure. The training data may be collected and used as input into a machine learning model. Based on the one or more condition specific parameters as well as the mean transit time, the CFR value and/or the IMR value, the machine learning model may determine the microvascular resistance of the blood vessel.

As another example, medical history, such as known a previous diagnosis of diabetes, of the patient may be input and processed in conjunction with the CFR value and/or IMR value to determine the microvascular resistance of the blood vessel. According to some examples, one or more condition specific parameters may be introduced based on training data. In some examples, the condition specific parameters may be based on the medical history of the patient. For example, the medical history of the patient may indicate a history of diabetes. The training data may be collected and used as input into a machine learning model. Based on the one or more condition specific parameters as well as the mean transit time, the CFR value and/or the IMR value, the machine learning model may determine the microvascular resistance of the blood vessel.

As another example, medical history, such as known a previous diagnosis of hypertension, of the patient may be input and processed in conjunction with the CFR value and/or IMR value to determine the microvascular resistance of the blood vessel. According to some examples, one or more condition specific parameters may be introduced based on training data. In some examples, the condition specific parameters may be based on the medical history of the patient. For example, the medical history of the patient may indicate a history of hypertension. The training data may be collected and used as input into a machine learning model. Based on the one or more condition specific parameters as well as the mean transit time, the CFR value and/or the IMR value, the machine learning model may determine the microvascular resistance of the blood vessel.

In one embodiment, microvascular resistance may be determined based on the determined mean transit time, the CFR value and/or the IMR value, and the vessel type being imaged and/or diagnosed. By way of example, vessel type, such as left anterior descending ("LAD") artery, of the patient may be input and processed in conjunction with the CFR value and/or IMR value to determine the microvascular resistance of the blood vessel. According to some examples, one or more vessel specific parameters may be introduced based on training data. In some examples, the vessel specific parameters may be based on the vessel type. For example, the type may be a LAD. The training data may be collected and used as input into a machine learning model. Based on the one or more vessel specific parameters as well as the mean transit time, the CFR value and/or the IMR value, the machine learning model may determine the microvascular resistance of the blood vessel.

As another example, vessel type, such as left circumflex artery ("LCX"), of the patient may be input and processed in conjunction with the CFR value and/or IMR value to determine the microvascular resistance of the blood vessel. According to some examples, one or more vessel specific parameters may be introduced based on training data. In some examples, the vessel specific parameters may be based on the vessel type. For example, the type may be a LCX. The training data may be collected and used as input into a machine learning model. Based on the one or more vessel specific parameters as well as the mean transit time, the CFR value and/or the IMR value, the machine learning model may determine the microvascular resistance of the blood vessel.

As another example, vessel type, such as right coronary artery ("RCA"), of the patient may be input and processed in conjunction with the CFR value and/or IMR value to determine the microvascular resistance of the blood vessel. According to some examples, one or more vessel specific parameters may be introduced based on training data. In some examples, the vessel specific parameters may be based on the vessel type. For example, the type may be a RCA. The training data may be collected and used as input into a machine learning model. Based on the one or more vessel specific parameters as well as the mean transit time, the CFR value and/or the IMR value, the machine learning model may determine the microvascular resistance of the blood vessel.

As another example, vessel type, such as the left marginal artery, of the patient may be input and processed in conjunction with the CFR value and/or IMR value to determine the microvascular resistance of the blood vessel. According to some examples, one or more vessel specific parameters may be introduced based on training data. In some examples, the vessel specific parameters may be based on the vessel type. For example, the type may be a left marginal artery. The training data may be collected and used as input into a machine learning model. Based on the one or more vessel specific parameters as well as the mean transit time, the CFR value and/or the IMR value, the machine learning model may determine the microvascular resistance of the blood vessel.

As another example, vessel type, such as diagonal arteries, of the patient may be input and processed in conjunction with the CFR value and/or IMR value to determine the microvascular resistance of the blood vessel. According to some examples, one or more vessel specific parameters may be introduced based on training data. In some examples, the vessel specific parameters may be based on the vessel type. For example, the type may be diagonal arteries. The training data may be collected and used as input into a machine learning model. Based on the one or more vessel specific parameters as well as the mean transit time, the CFR value and/or the IMR value, the machine learning model may determine the microvascular resistance of the blood vessel.

As another example, vessel type, such as the right marginal artery, of the patient may be input and processed in conjunction with the CFR value and/or IMR value to determine the microvascular resistance of the blood vessel. According to some examples, one or more vessel specific parameters may be introduced based on training data. In some examples, the vessel specific parameters may be based on the vessel type. For example, the type may be a right marginal artery. The training data may be collected and used as input into a machine learning model. Based on the one or more vessel specific parameters as well as the mean transit time, the CFR value and/or the IMR value, the machine learning model may determine the microvascular resistance of the blood vessel.

In one embodiment, microvascular resistance may be determined based on the determined mean transit time, the CFR value and/or the IMR value, and patient treatment history. By way of example patient treatment history, such as prior percutaneous coronary intervention ("PCI"), may be input and processed in conjunction with the CFR value and/or IMR value to determine the microvascular resistance of the blood vessel. According to some examples, one or more treatment parameters may be introduced based on training data. In some examples, the treatment parameters may be based on a patient's treatment history. For example, the patient may have had a prior PCI. Prior PCI may generate microvascular damage and, therefore, may be considered when determining the microvascular resistance of the blood vessel. The training data may be collected and used as input into a machine learning model. Based on the one or more vessel specific parameters as well as the mean transit time, the CFR value and/or the IMR value, the machine learning model may determine the microvascular resistance of the blood vessel.

As another example, patient treatment history, such as coronary artery bypass graft ("CABG"), may be input and processed in conjunction with the CFR value and/or IMR value to determine the microvascular resistance of the blood vessel. According to some examples, one or more treatment parameters may be introduced based on training data. In some examples, the treatment parameters may be based on a patient's treatment history. For example, the patient may have had a prior CABG. CABG may alter the cardiac physiology and/or may lead to microvascular alternations and, therefore may be considered when determining the microvascular resistance of the blood vessel. The training data may be collected and used as input into a machine learning model. Based on the one or more vessel specific parameters as well as the mean transit time, the CFR value and/or the IMR value, the machine learning model may determine the microvascular resistance of the blood vessel.

Figure 1:
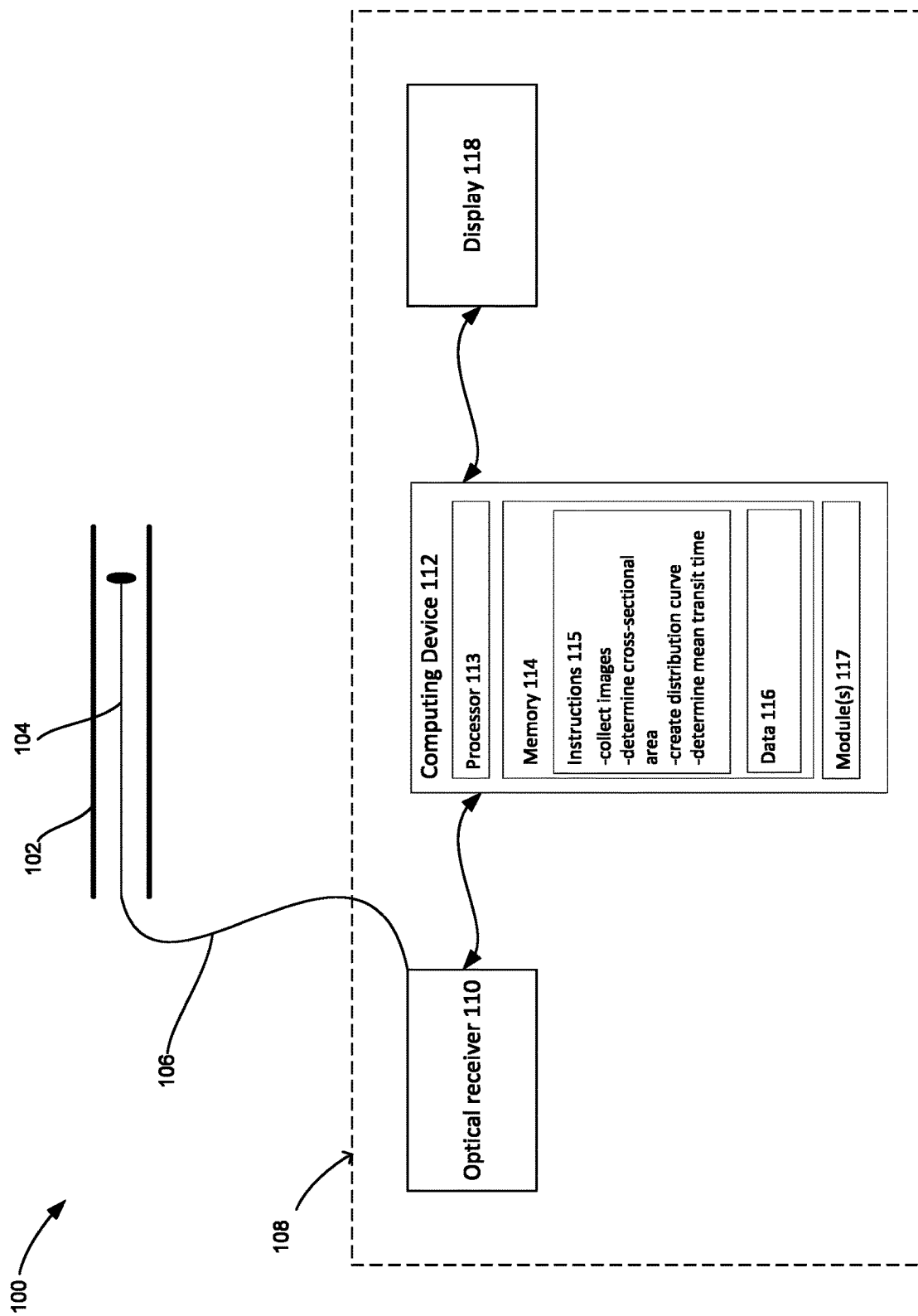
FIG. 1 is an example system according to aspects of the disclosure.

FIG. 1 illustrates a data collection system 100 for use in collecting intravascular data. The system may include a data collection probe 104 that can be used to image a blood vessel 102. The data collection probe 104 may be an OCT probe, an IVUS catheter, micro-OCT probe, near infrared spectroscopy (NIRS) sensor, or any other device that can be used to image a blood vessel 102. While the examples provided herein refer to an OCT probe, the use of an OCT probe is not intended to be limiting. An IVUS catheter may be used in conjunction with or instead of the OCT probe. A guidewire, not shown, may be used to introduce the probe 104 into the blood vessel 102. The probe 104 may be introduced and pulled back along a length of a blood vessel while collecting data. According to some examples, probe 104 may be held stationary during a pullback such that a plurality of scans of OCT and/or IVUS data sets may be collected. The data sets, or frames of image data, may be used to identify features, such as the cross-sectional area of the bolus.

The probe 104 may be connected to a subsystem 108 via an optical fiber 106. The subsystem 108 may include a light source, such as a laser, an interferometer having a sample arm and a reference arm, various optical paths, a clock generator, photodiodes, and other OCT and/or IVUS components.

The probe 104 may be connected to an optical receiver 110. According to some examples, the optical receiver 110 may be a balanced photodiode based system. The optical receiver 110 may be configured to receive light collected by the probe 104.

The subsystem may include a computing device 112. The computing device may include one or more processors 113, memory 114, instructions 115, data 116, and one or more modules 117.

The one or more processors 113 may be any conventional processors, such as commercially available microprocessors. Alternatively, the one or more processors may be a dedicated device such as an application specific integrated circuit (ASIC) or other hardware-based processor. Although FIG. 1 functionally illustrates the processor, memory, and other elements of device 110 as being within the same block, it will be understood by those of ordinary skill in the art that the processor, computing device, or memory may actually include multiple processors, computing devices, or memories that may or may not be stored within the same physical housing. Similarly, the memory may be a hard drive or other storage media located in a housing different from that of device 112. Accordingly, references to a processor or computing device will be understood to include references to a collection of processors or computing devices or memories that may or may not operate in parallel.

Memory 114 may store information that is accessible by the processors, including instructions 115 that may be executed by the processors 113, and data 116. The memory 114 may be a type of memory operative to store information accessible by the processors 113, including a non-transitory computer-readable medium, or other medium that stores data that may be read with the aid of an electronic device, such as a hard-drive, memory card, read-only memory ("ROM"), random access memory ("RAM"), optical disks, as well as other write-capable and read-only memories. The subject matter disclosed herein may include different combinations of the foregoing, whereby different portions of the instructions 115 and data 116 are stored on different types of media.

Memory 114 may be retrieved, stored or modified by processors 113 in accordance with the instructions 115. For instance, although the present disclosure is not limited by a particular data structure, the data 116 may be stored in computer registers, in a relational database as a table having a plurality of different fields and records, XML documents, or flat files. The data 116 may also be formatted in a computer-readable format such as, but not limited to, binary values, ASCII or Unicode. By further way of example only, the data 116 may be stored as bitmaps comprised of pixels that are stored in compressed or uncompressed, or various image formats (e.g., JPEG), vector-based formats (e.g., SVG) or computer instructions for drawing graphics. Moreover, the data 116 may comprise information sufficient to identify the relevant information, such as numbers, descriptive text, proprietary codes, pointers, references to data stored in other memories (including other network locations) or information that is used by a function to calculate the relevant data.

The instructions 115 can be any set of instructions to be executed directly, such as machine code, or indirectly, such as scripts, by the processor 113. In that regard, the terms "instructions," "application," "steps," and "programs" can be used interchangeably herein. The instructions can be stored in object code format for direct processing by the processor, or in any other computing device language including scripts or collections of independent source code modules that are interpreted on demand or compiled in advance. Functions, methods and routines of the instructions are explained in more detail below.

The modules 117 may include a plaque, such as calcium plaque, detection module, a display module, a flow rate, or mean transit time, module, stent detection or other detection and display modules. For example, the computing device 112 may access a flow rate module for detecting the mean transit time of blood in the blood vessel. According to some examples, the modules may include an image data processing pipeline or component modules thereof. The image processing pipeline may be used to transform collected OCT data into two-dimensional ("2D") and/or three-dimensional ("3D") views and/or representations of blood vessels, stents, and/or detected regions.

The subsystem 108 may include a display 118 for outputting content to a user. As shown, the display 118 is separate from computing device 112 however, according to some examples, display 118 may be part of computing device 112. The display 118 may output image data relating to one or more features detected in the blood vessel. For example, the output may include, without limitation, cross-sectional scan data, longitudinal scans, diameter graphs, image masks, lumen border, plaque sizes, plaque circumference, visual indicia of plaque location, visual indicia of risk posed to stent expansion, flow rate, etc. The display 118 may identify features with text, arrows, color coding, highlighting, contour lines, or other suitable human or machine readable indicia.

According to some examples the display 118 may be a graphic user interface ("GUI"). One or more steps may be performed automatically or without user input to navigate images, input information, select and/or interact with an input, etc. The display 118 alone or in combination with computing device 112 may allow for toggling between one or more viewing modes in response to user inputs. For example, a user may be able to toggle between different side branches on the display 118, such as by selecting a particular side branch and/or by selecting a view associated with the particular side branch.

In some examples, the display 118, alone or in combination with computing device 112, may include a menu. The menu may allow a user to show or hide various features. There may be more than one menu. For example, there may be a menu for selecting blood vessel features to display. Additionally or alternatively, there may be a menu for selecting the virtual camera angle of the display.

FIGS. 2A-2F illustrate an example sequence of image frames obtained when the intravascular imaging probe is held stationary at a location within the blood vessel. The intravascular imaging probe may be an OCT probe or an IVUS catheter.

For example, a pullback of the OCT probe may be stopped at a given location. When the pullback is stopped, the OCT probe may be held stationary such that the OCT probe collects a plurality of image frames at that location. A bolus of lumen flush may be injected into the blood vessel at a location such that the bolus will flow towards the OCT probe. The lumen flush may be, for example, contrast medium. While the examples provided herein refer to the lumen flush as contrast, the use of the term contrast is not intended to be limiting. In examples where an IVUS catheter is used instead of the OCT probe, the bolus injected to the blood vessel may consist of a medium that can be imaged by the IVUS catheter. The medium may be, for example, microbubble contrast agents. The sequence of image frames may show the blood vessel before, during, and after the bolus approaches the OCT probe. The sequence of image frames may be used to determine the flow rate of the bolus, and therefore the blood, within the blood vessel. For example, each image may include a timestamp to indicate when the image frame was taken by the OCT probe. The cross-sectional area of the bolus within the image frame may be determined. The determined cross-sectional area of the bolus within the blood vessel may be used, along with the time stamp, to determine the flow, and, therefore, the mean transit time of blood within the blood vessel.

Figure 2B:
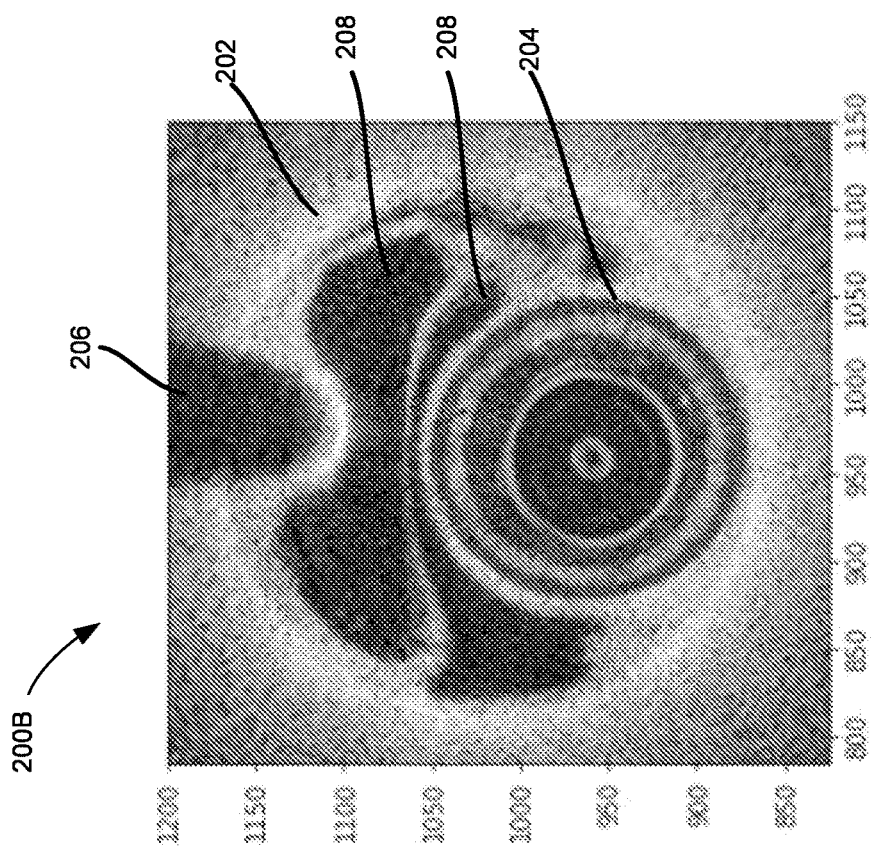
Figure 2A:
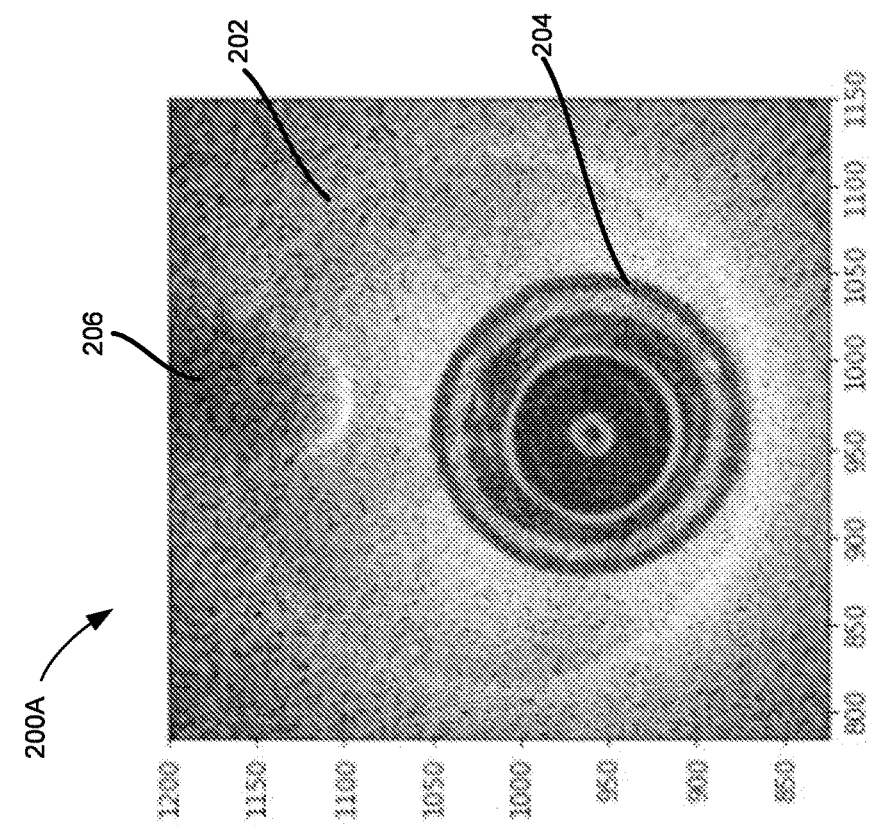
Figure 2F:
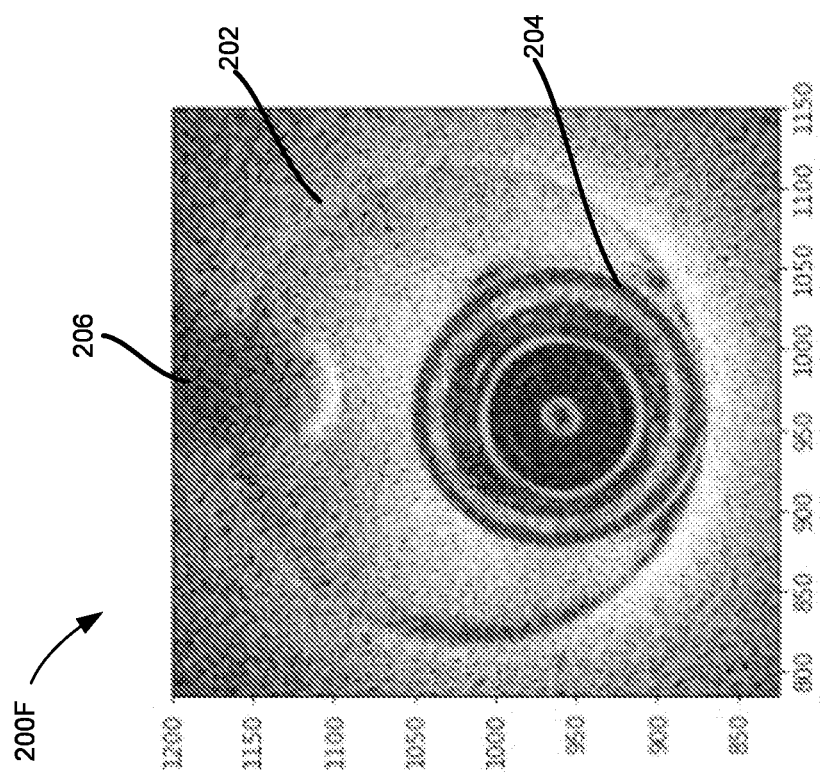

FIGS. 2A-2F are in a sequential order, in which FIG. 2A is a first image 200A frame in the sequence of image frames obtained at a time t1, before the bolus reaches the OCT probe, and FIG. 2F is the last image frame 200F in the sequence of image frames obtained at time t6, after the bolus passes the OCT probe. While FIGS. 2A-2F illustrate a sequence of image frames taken by the OCT probe while held stationary, the OCT probe may capture one or more images frames between each image frame illustrated in FIGS. 2A-2F. For example, OCT probe may capture a plurality of images and the sequence of image frames shown in FIGS. 2A-2F may only be six (6) of those plurality of images frame. Thus, showing the sequence of image frames as six (6) images frames is merely exemplary and is not intended to be limiting.

FIG. 2A illustrates an example first image frame 200A taken by an OCT probe when held stationary. Image frame 200A may be taken at time t1 before a bolus is injected into the blood vessel. Image frame 200A may include lumen boundary 202 of the blood vessel, catheter 204, and guidewire 206. Image frame 200A may be taken at a time before the bolus is injected, image frame 200A does not include the bolus.

FIG. 2B illustrates an example second image frame 200B taken by the OCT probe when held stationary at time t2. After the bolus is injected into the blood vessel, the bolus may travel along the blood vessel towards the OCT probe. Image frame 200B illustrates bolus 208 as it reaches the OCT probe. The bolus 208 is shown as the darkened part of image frame 200B within lumen 202. As shown in FIG. 2B, bolus 208 is not solid but, rather, is shown as multiple portions within lumen boundary 202 of the blood vessel. The segments may be, for example, the liquid contrast broken up into smaller portions within the vessel. This may be due to the bolus 208B passing by the by guidewire 206 and catheter 204. In some examples, bolus 208 may appear as multiple portions due to the speed at which the bolus 208 is traveling, the light reflecting off bolus 208 within the blood vessel, etc.

FIG. 2C illustrates an example third image frame 200C taken at time t3 by the OCT probe when held stationary in the blood vessel. Image frame 200C may be taken by OCT probe at the time bolus 208 encompasses the OCT probe as the bolus 208 passes by. For example, as the bolus 208 approaches the OCT probe, the bolus 208 in each image frame may occupy more space within the blood vessel, as defined by lumen 202.

Image frame 200C illustrates one example where the bolus 208 has traveled toward the OCT probe and envelopes the tip of the OCT probe. As shown, the largest cross-sectional diameter of bolus 208 may be passing by the tip of the OCT probe such that bolus 208 is shown as filling the space within the blood vessel, as defined by lumen 202. According to some examples, bolus 208 may shape or conform to the blood vessel as bolus 208 passes by the OCT probe, catheter 204, and guidewire 206. Thus, bolus 208 may not have a circular or oblong shape but, instead, may have a shape based on the objects bolus 208 encounters and/or the shape of lumen 202.

FIG. 2D illustrates an example fourth image frame 200D taken at time t4 by the OCT probe when held stationary in the blood vessel. Image frame 200D may be captured by the OCT probe after the majority of bolus 208 has passed the tip of the OCT probe. For example, a majority of bolus 208 may have passed the OCT probe such that only a portion of bolus 208 is captured in image frame 200D.

Figure 2E:
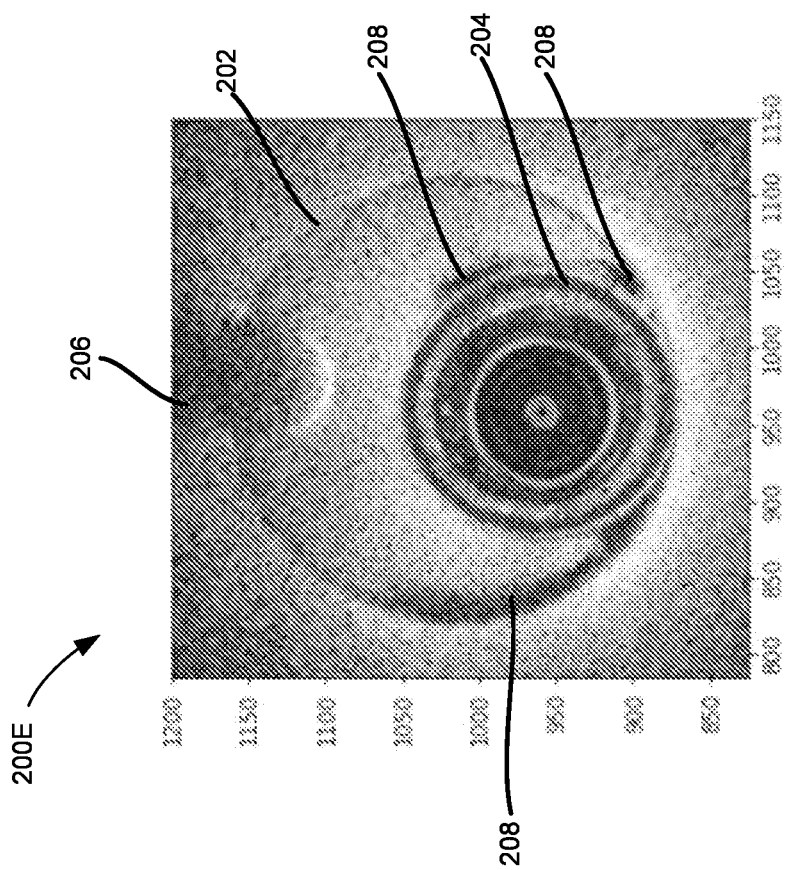

FIG. 2E illustrates an example fifth image frame 200E taken at time t5. Image frame 200E may include less bolus 208 as compared to image frame 200D. This may indicate that bolus 208 continues to travel past the OCT probe.

FIG. 2F illustrates an example sixth image frame 200F taken at time t6. Image frame 200F may include less of bolus 208 as compared to image frame 200E. Any subsequent image frames may include even less of bolus 208 or may not include any bolus 208 at all as bolus 208 may have completely passed the OCT probe.

The cross-sectional area of the bolus 208 within image frames 200A-200F may be used to create an area dilution curve and, therefore, calculate the mean transit time "Tmn" of blood within the blood vessel. To create an area dilution curve, the area of contrast in each image frame is determined. To determine the area of contrast in each image frame, each image may be segmented by thresholding. A vessel mask may be determined using lumen, catheter and guidewire offsets. An element-wise operation between the determined vessel mask and the thresholded image may be used to determine a contrast mask. The sum of the pixels in the contrast mask identified as the bolus may be summed as the area of contrast in each image frame. The area of contrast in each image frame may be graphed to create an area dilution curve. One or more operations may be applied to the area dilution curve to determine the mean transit time. For example, the area dilution curve may be smoothed via a median filter, a peak closest to the center of the stationary image frame capture may be determined, a Gaussian fit may be applied to the smoothed curve using the determined peak, zero values of the Gaussian fit curve may be taken four standard deviations outside the Gaussian fit, a log normal fit may be applied to the smoothed curve, an initial time the bolus first reaches the catheter may be determined using the log normal fit and the area dilution curve, and the initial time, area dilution curve, and log normal fit curve may be used to determine the mean transit time.

Figure 3:
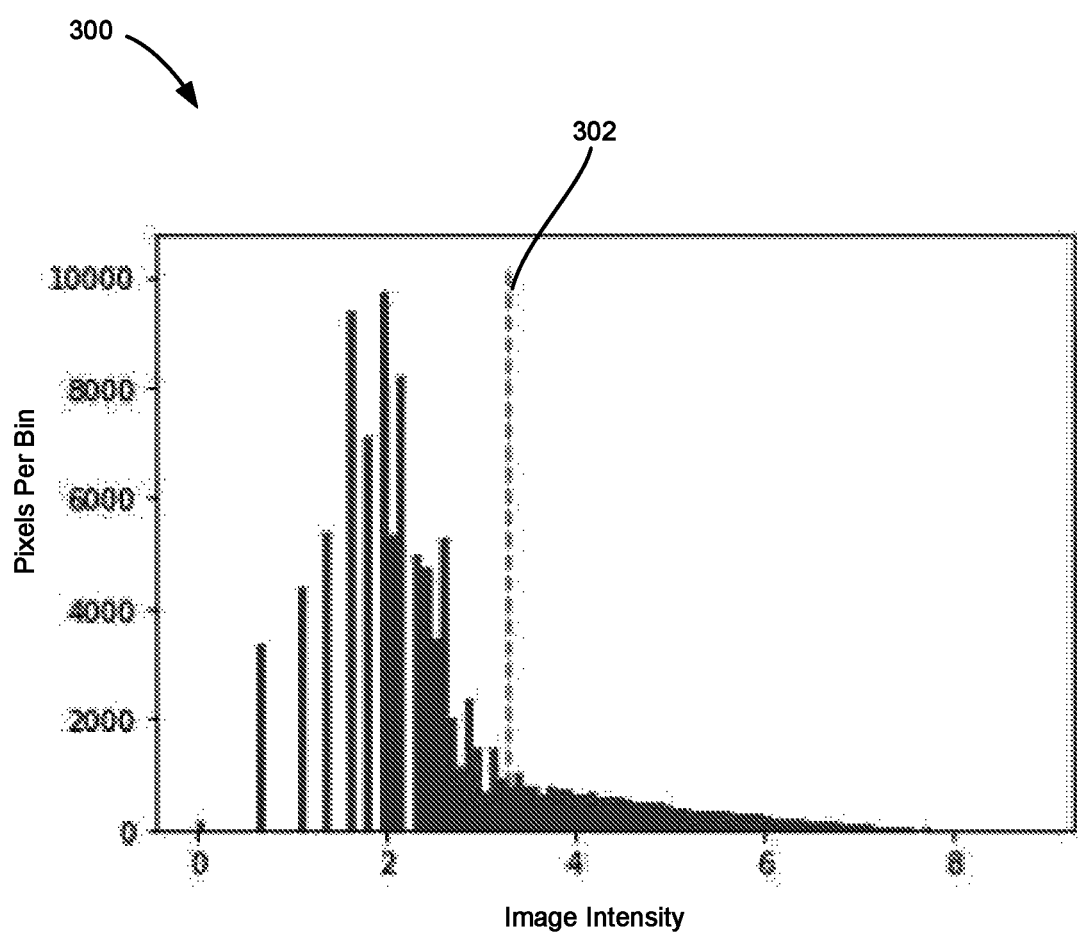
FIG. 3 is an example chart comparing pixels per bin to image intensities according to aspects of the disclosure.

FIG. 3 illustrates an example chart identifying the threshold of the segmented images. A segmented image may be, for example, separating or segmenting an area of the vessel from the rest of the image. Chart 300 compares the pixels per bin on the y-axis to the image intensity on the x-axis for the image frames captured by the OCT probe when held stationary in the blood vessel.

The threshold may be determined using a Gaussian mixture model with two nodes, such that N=2. The two nodes may be two different Gaussian models, such that the peaks of the models are offset. In some examples, the two models may be the contrast and the brightness of the image frame. According to some examples, the two modes, or models, may be the value with noise and the areas of the lumen with the blood. The low value with noise may be the background and the areas of the lumen with blood may be the area where there is signal. The two nodes may be overlaid to determine the threshold. The threshold may be the average of the means of each node. As shown in FIG. 3, the threshold is indicated on chart 300 by line 302.

According to some examples, the threshold may be fixed or predetermined. In other examples, the threshold may be determined using Otsu's threshold. In yet other examples, the threshold may be determined using deep learning. For example, a group or set of images may be stored. The stored images may be the input to the deep learning model. For each image, the threshold may be determined. The determined threshold may be the output of the deep learning model. The deep learning model, or convolutional neural network, may be trained to perform regression, such that an image may be the input and the threshold may be the output. Additionally or alternatively, the threshold may be determined by any combination of the Gaussian mixture model, fixed thresholds, Otsu's threshold, and/or deep learning.

Figure 4A:
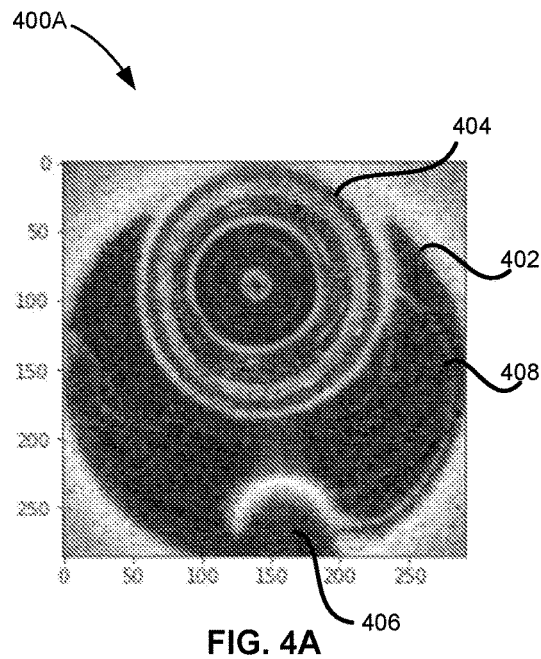
FIG. 4A is an example image frame taken by an OCT probe while held stationary in a blood vessel according to aspects of the disclosure.
Figure 4B:
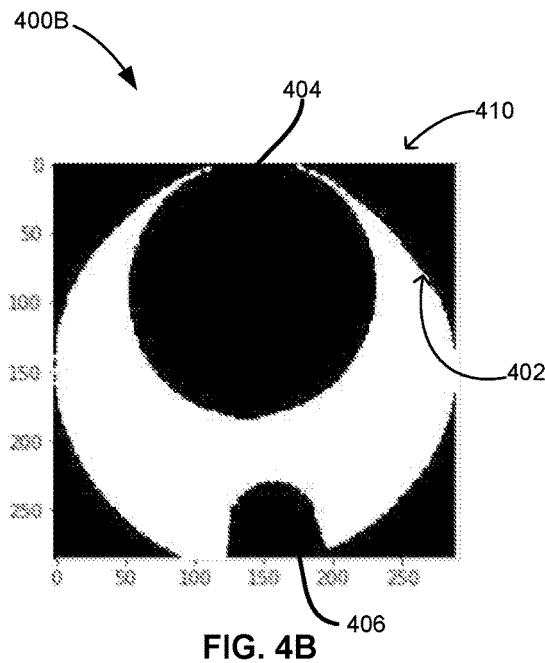
FIG. 4B is an example vessel mask of the image frame of FIG. 4A according to aspects of the disclosure.

FIGS. 4A and 4B illustrate an example of determining a vessel mask using the lumen, catheter, and guidewire offsets. The vessel mask may define the space within the lumen boundary that may be occupied by the bolus as the bolus travels through the blood vessel past the OCT probe. For example, the vessel mask may define the maximum area within the lumen that may be occupied by the bolus at any given time.

Image frame 400A may include the lumen boundary 402, catheter 404, guidewire 406, and bolus 408. The lumen, catheter, and guidewire offsets may be determined by one or more software modules used in conjunction with system 100, shown in FIG. 1. For example, the offset of the guidewire may be determined by searching for peaks, transitions, or relative extrema along the scan lines within the shadows. Interpolation may be used to model connected segments of a guidewire in the image frame. In some examples, interpolation may be performed using one or more modules and various intravascular data processing steps. According to some examples, interpolation may construct a segment of guidewire detections in a frame and connects valid segments to create a connected model of the guidewires. A segment may be determined to be valid based on various criteria which can be used to score segments. Segment scores and segment continuity can be used to generate representations of guidewires in the image frames and, therefore, used to determine guidewire offsets. A guidewire may be scored based on its segments. Similar methods may be used to determine the lumen and catheter offsets and, therefore, are not repeated herein.

After the lumen, catheter, and guidewire offsets are determined, the vessel mask 410 may be determined. As shown in image frame 400B, vessel mask 410 may be defined by the boundary of the lumen, guidewire, and catheter. The vessel mask 410 may indicate the cross-sectional area of the blood vessel with the guidewire and catheter inserted. Thus, the vessel mask 410 may indicate the cross-sectional area that may be available for the bolus to pass through.

Figure 5:
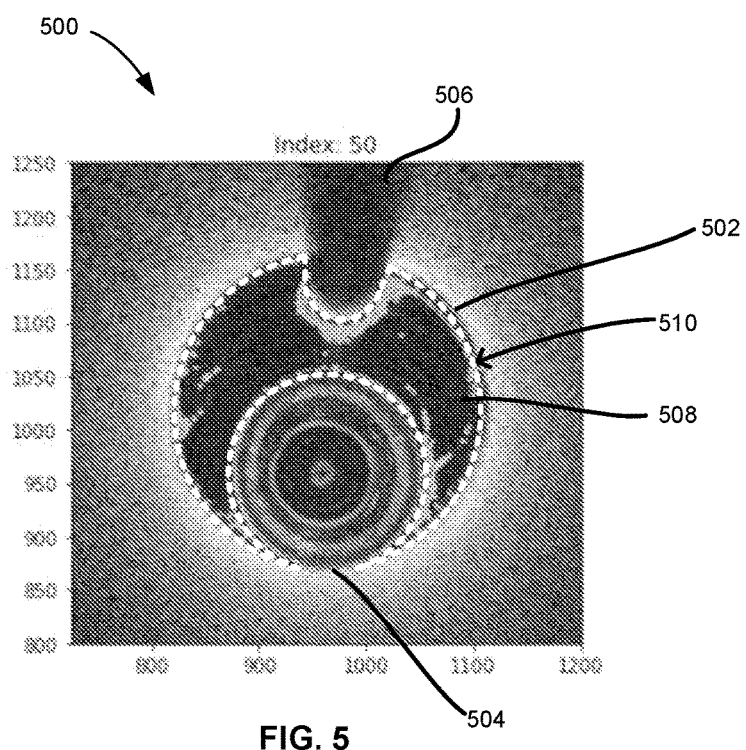
FIG. 5 is an example of using the image frame of FIG. 4A and the vessel mask of FIG. 4B to create a contrast mask

FIG. 5 illustrates an example image frame in which the vessel mask and the thresholded image may be used to determine a contrast mask. A contrast mask may be determined using an element-wise operation between the determined threshold and vessel mask. For example, the contrast mask may determine how much area within the vessel mask is occupied by the bolus 208. The contrast mask may be used to determine the cross-sectional area of the bolus. The cross-sectional area may be measured in pixels. Image frame 500 may substantially correspond to image frame 400A, which was used to determine the vessel mask 410, such that vessel mask 510 substantially corresponds to vessel mask 410. Vessel mask 510 may indicate the total cross-sectional area within lumen boundary 502 that bolus 508 may occupy when passing the OCT probe. For example, the vessel mask 510 may indicate the cross-sectional area of the lumen boundary 502 remaining once the OCT probe, including catheter 504 and guidewire 506, are accounted for.

Elementwise operations may be applied between the vessel mask and the thresholded image to determine a contrast mask. For example, a logical array operator "AND" may be used between the vessel mask and the thresholded image. The elementwise operation may determine, on a pixel-by-pixel basis, whether the pixels within the vessel mask are pixels of the bolus. The pixels that are determined to be part of the bolus may be summed to determine the cross-sectional area of the bolus.

Figure 6:
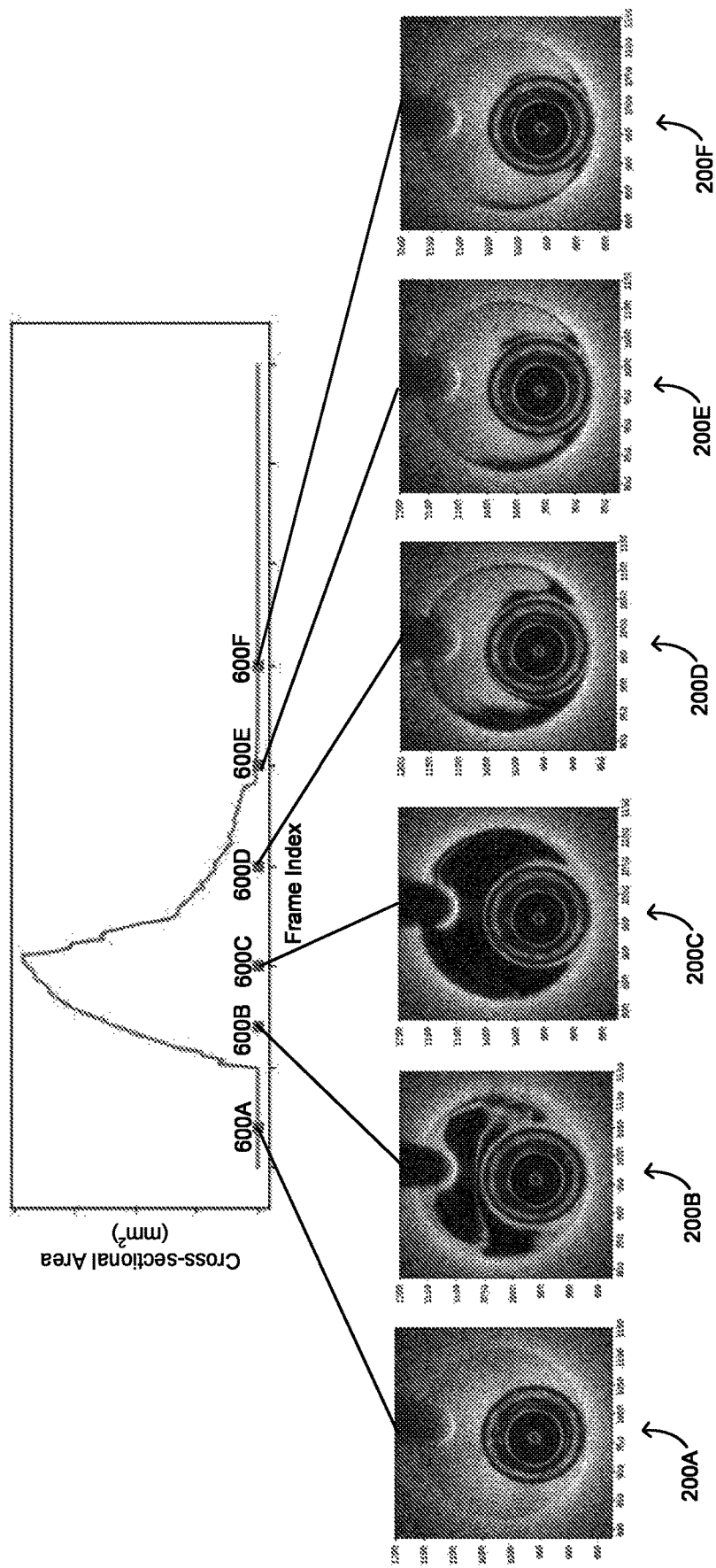
FIG. 6 is an example area dilution curve computed according to aspects of the disclosure.

FIG. 6 illustrates an example area dilution curve. The area dilution curve 600 illustrates the cross-sectional area of the bolus at a given time as the bolus flows through the blood vessel past the OCT probe. For example, area dilution curve 600 may chart the cross-sectional area in mm^2 for each frame, identified by its respective frame index. The frame index may be a number identifying a particular image frame within the plurality of images frames. For example, if one hundred (100) images frames are taken, the frame index will correspond to a number between one (1) and one hundred (100). Each image frame may include a time stamp. The frame index may, in some examples, correspond to the time stamp of the respective image frame. In some examples, the area dilution curve 600 may chart the cross-sectional area based on the time the image frame was taken instead of the frame index.

As shown, area dilution curve 600 is a chart of image frames 200A-200F. Each of image frames 200A-200F may be segmented by thresholding to determine the area of contrast in each frame. A vessel mask may be determined for each image frame 200A-200F based on the lumen, catheter, and guidewire offsets. Additionally or alternatively, a contrast mask may be determined for each image frame 200A-200F. The contrast mask may be determined using an elementwise operation between the thresholded image and the vessel mask. The contrast mask may be used to determine the cross-sectional area of the bolus by determining the sum of the pixels within the contrast mask. The cross-sectional area may then be graphed to create area dilution curve 600.

While only image frames 200A-200F are indicated on area dilution curve 600 by points 600A-600F, respectively, additional image frames captured when the OCT probe is held stationary in the blood vessel may be used to create area dilution curve 600. The area dilution curve 600 may be used to determine the mean transit time "Tmn." Mean transit time may be the flow rate of blood within the blood vessel.

The area dilution curve 600 may indicate whether the bolus moves quickly or slowly through the blood vessel. For example, area dilution curve 600 may have a width "w." The width "w" may be defined by a first image frame and a last image frame in the plurality of image frames that includes at least a portion of the bolus. If the bolus is moving quickly through the blood vessel, the width "w" may be less than if the bolus was moving slowly through the blood vessel. For example, if the bolus is moving quickly, the image frames capturing a portion of the bolus may occur during a smaller time period as the bolus takes less time to move a certain distance. Alternatively, if the bolus is moving slowly, the image frames capturing a portion of the bolus may occur during a larger or longer time period as the bolus may take more time to move a certain distance. As time, or image frames, is on the x-axis of the area dilution curve, a short time period will have a small width "w" whereas a long time period will have a larger width "w."

FIGS. 7A-7F illustrate one example method of using area dilution curve 600 to determine the mean transit time. The following operations do not have to be performed in the precise order described below. Rather, various operations can be handled in a different order or simultaneously, and operations may be added or omitted.

Figure 7A:
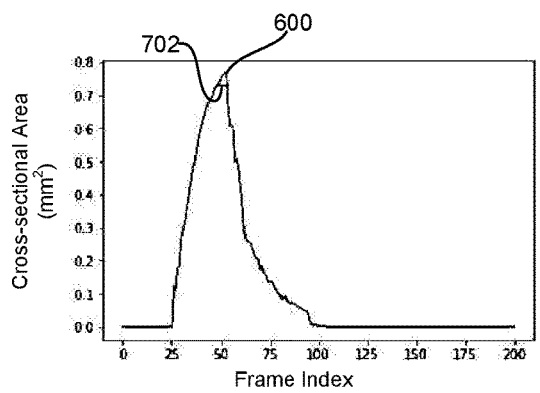
FIGS. 7A-7F are example method steps applied to the area dilution curve of FIG. 6 according to aspects of the disclosure.

FIG. 7A illustrates a smoothed area dilution curve. For example, the area dilution curve 600 may be smoothed with a median filter. Smoothing the area dilution curve may remove or smooth jagged areas of the curve. Jagged areas of the curve may be due to improper lumen offsets determinations. As shown in FIG. 7A, area dilution curve 600 has been smoothed to curve 702.

Figure 7B:
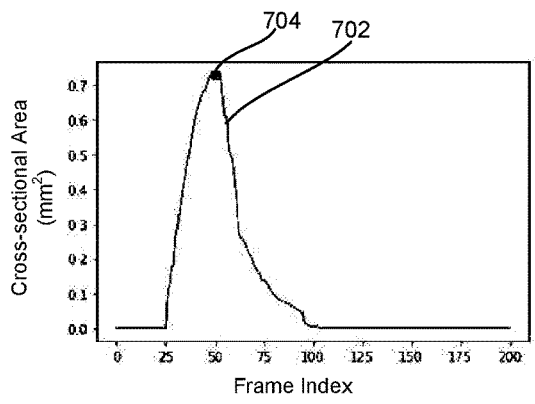

FIG. 7B illustrates a peak of curve 702. The peak 704 may be the peak closest to the center of the stationary image frame capture. When the OCT probe is held stationary, one or more boluses may be injected into the blood vessel. As shown in FIG. 7B, only a single bolus is injected into the blood vessel and, therefore, there is only one peak 704. According to some examples, where more than one bolus is injected into the blood vessel, chart 700B may include a peak for each bolus.

Figure 7C:
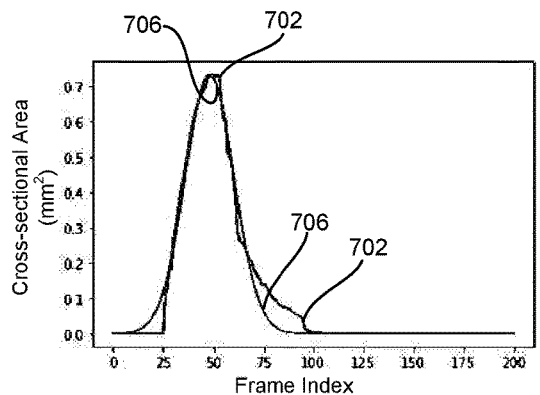

FIG. 7C illustrates a Gaussian fit applied to the smoothed curve using the determined peak. The determined peak 704 may be, for example, the mean value used to apply the Gaussian fit. FIG. 7C illustrates the difference between the smoothed curve 702 and the Gaussian fit curve 706.

Figure 7D:
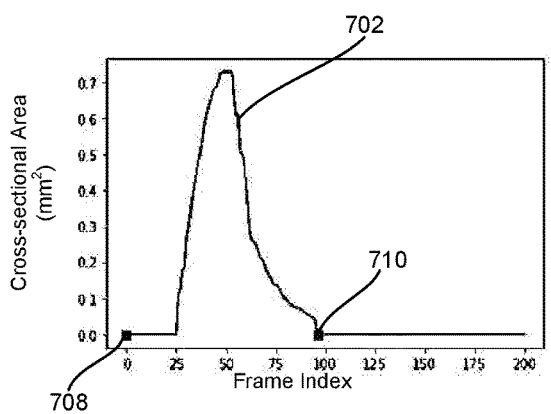

FIG. 7D illustrates the zero values of curve 702 taken four standard deviations outside of the Gaussian fit. The zero values are indicated by points 708, 710. Any values to the left of point 708 and to the right of 710 may be removed. Removing values outside of points 708, 710 may ensure that any artifacts in the blood vessel before and/or after the bolus do not affect the determination of mean transit time. According to some examples, the artifacts may be previous bolus or the next bolus injected into the blood vessel.

Figure 7E:
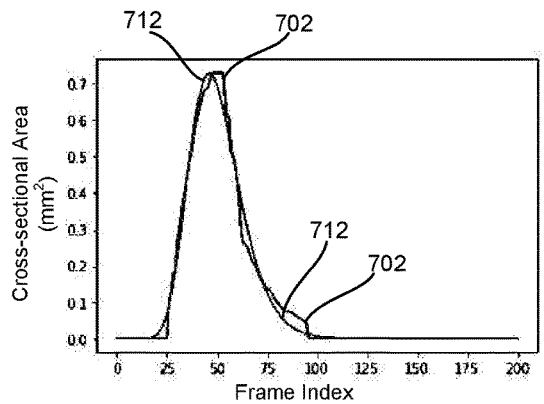

FIG. 7E illustrates a resulting curve 712 that was created by applying a log normal fit to the smoothed curve 702. According to some examples, applying a log normal fit to the smoothed curve 702, resulting in curve 712, may result in a closer fit to the measured signal. Additionally or alternatively, the log normal fit, curve 712, may be a more accurate fit as compared to the Gaussian fit, curve 706.

Figure 7F:
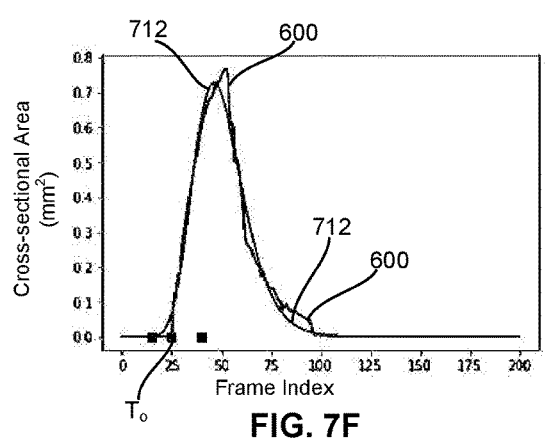

FIG. 7F illustrates the log normal fit curve 712 overlaid on area dilution curve 600. The log normal fit curve 712 and/or the area dilution curve 600 may be used to determine the initial time "To." Initial time "To" may be determined by finding the first increase in cross-sectional area in the log normal fit curve 712 and/or the area dilution curve 600. The initial time "To" may be the initial time at which any portion of the bolus first reaches the OCT probe.

As shown, initial time "To" may occur at frame index 25. Frame index 25 may be where the cross-sectional area of the bolus first changes from 0 mm^2 to a positive value. According to some examples, the frame index may correspond to a certain time. The time may be the time-stamped time on the image frame.

As shown in FIG. 7F, the centroid of the log normal fit curve 712 may be to the right of the peak in the area dilution curve 600. In some examples, the shift in the peak is due to the log normal fit applied to the area dilution curve 600. For example, a log normal curve is not symmetric whereas a Gaussian curve is symmetric. Therefore, the peak may be shifted due to the asymmetry of the log normal curve.

Figure 8:
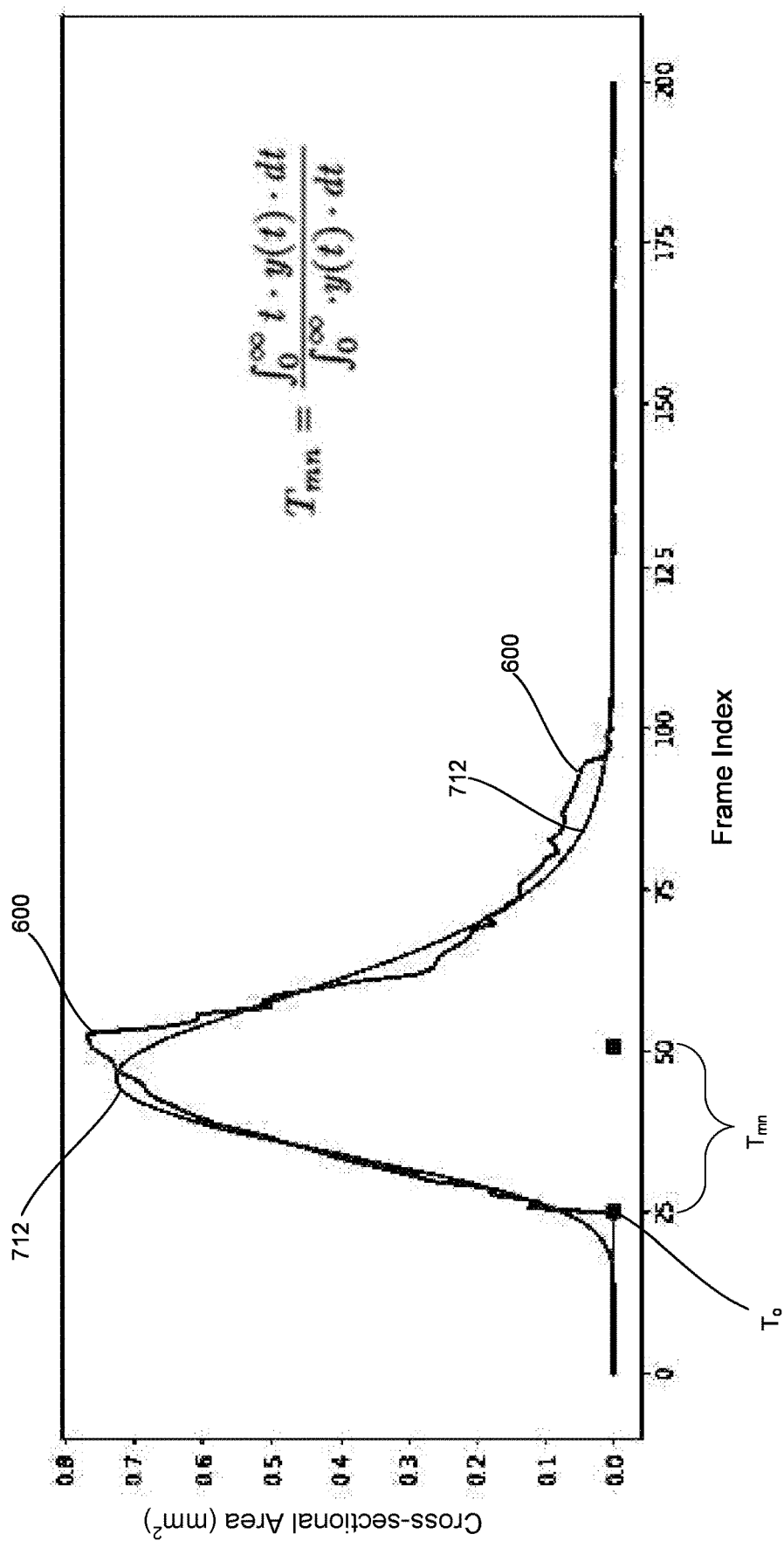
FIG. 8 is an example of mean transit time according to aspects of the disclosure.

FIG. 8 illustrates how the area dilution curve 600 and the log normal fit curve 712 may be used to determine the mean transit time "Tmn" of the bolus flowing in the blood vessel. The mean transit time "Tmn" may be determined using the initial time "To" determined using area dilution curve 600 and the log normal fit curve 712. According to some examples, the mean transit time "Tmn" may be determined using the following equation:

$$T_{mn} = \frac{\int_0^\infty t \cdot y(t) \cdot dt}{\int_0^\infty y(t) \cdot dt}$$

In the equation, "t" may correspond to time. The time may be the time-stamped time corresponding to the image frame of a given frame index. The "y" in the equation may correspond to the cross-sectional area of the bolus at that time "t."

Figure 10:
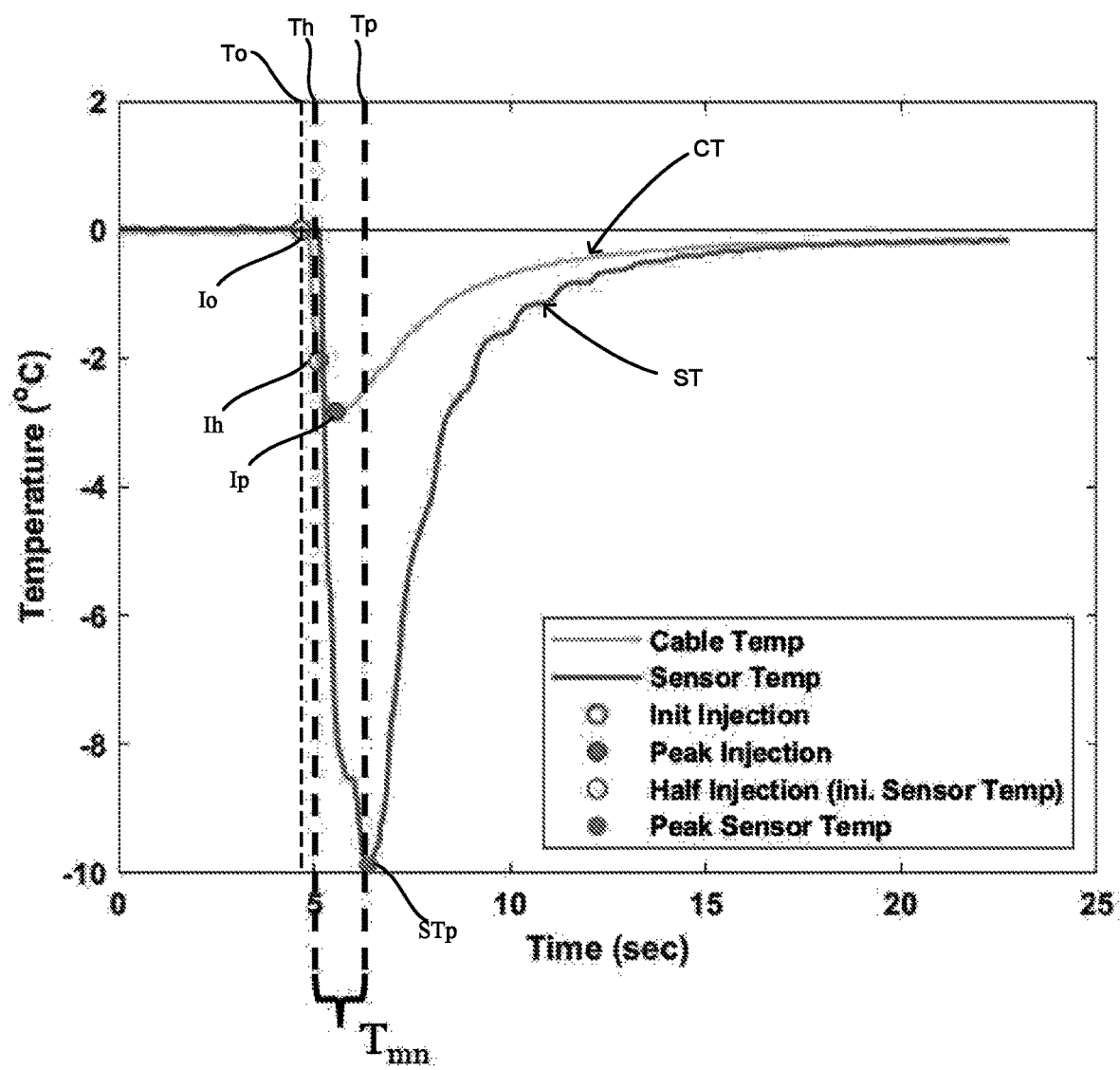
FIG. 10 is an example of mean transmit time according to aspects of the disclosure.

FIG. 10 illustrates how thermodilution measurements can be used to determine mean transit time "Tmn" of a bolus flowing in the blood vessel. For example, a pressure wire may be used to determine thermodilution measurements. The mean transit time "Tmn" may be determined using the time of the initial sensor temperature reading and time of the peak sensor temperature reading. According to some examples, the initial sensor temperature reading may be at the same time of the halfway point of the injection of the bolus. In some examples, mean transit time "Tmn" may be the time elapsed between the time of initial sensor temperature reading and the time of the peak sensor temperature reading.

Graph 1000 illustrates an example curve of the temperature readings of a cable "CT" and sensor "ST", in degrees Celsius, over time as a bolus is injected into a blood vessel. For example, when the bolus is initially injected "Jo" at time "to", the cable temperature "CT" and the sensor temperature "ST" may be zero degrees Celsius. At time "Th", approximately half the injection "Ih" may be completed. At time "Th" a reading of the initial sensor temperature may be taken. The cable temperature "CT" and sensor temperature "ST" may decrease, or become colder, as the bolus is injected. For example, at time "To", the cable temperature "CT" and sensor temperature "ST" may be negative two (−2) degrees Celsius.

The bolus may continue to be injected until it reaches peak injection "Ip". According to some examples, the peak cable temperature "CT" may occur at or substantially near the same time as the peak injection "Ip". According to some examples, the peak cable temperature may be a maximum negative temperature, such as approximately negative three (−3) degrees Celsius, as shown on graph 1000.

According to some examples, the sensor temperature "ST" may reach peak sensor temperature "STp" at some time "Tp" after peak injection "Ip". The difference between time "Tp" of the peak sensor temperature "STp" and time "Th" of half the injection "Ih" may be the mean transit time "Tmn". According to some examples, the mean transit time "Tmn" may be determine using the following equation:

$$T_{mn} = T_p - T_h$$

In the equation, "Tp" may correspond to the time of the peak sensor temperature "STp" and "Th" may correspond to the time of half the injection "Ih".

The mean transit time may be determined at rest and at hyperemia. Determining the mean transit time at rest may include collecting one or more images when the OCT probe is held stationary in a blood vessel in a natural state. For example, a natural state may be the state the blood vessel without any treatments or medications. Determining the mean transit time at hyperemia may include collecting one or more images when the OCT probe is held stationary in a blood vessel that has been pharmacologically induced hyperemia to create full dilation of the blood vessel.

The Tmn determined using the intravascular imaging probe may be the same or substantially the same as the Tmn determined using the pressure wire. Additionally or alternatively, the Tmn determined using the intravascular imaging probe may be the same or substantially the same as the flow rate determined by a flow meter. Accordingly, a single intravascular imaging device may be used to determine Tmn as well as to identify other aspects of microvascular disease.

According to some examples, the Tmn determined using the intravascular imaging probe may be used to determine the CFR. The Tmn may be determined both at rest and at hyperemia. The CFR may be determined using the determined mean transit time at rest "Tmn at rest" and the mean transit time during hyperemia "Tmn at hyperemia," as shown in the below equation:

$$CFR = \frac{T_{mn\,at\,rest}}{T_{mn\,at\,hyperemia}}$$

According to some examples, the CFR determined using the Tmn determined using the intravascular imaging probe may be the same or substantially the same as the CFR determined using a pressure wire.

According to some examples, the Tmn determined using the intravascular imaging probe may be used to determine IMR. The Tmn may be determined at rest and/or at hyperemia. For example, IMR may be determined using the follow equation:

$$IMR = P_{d\,at\,hyperemia} \times T_{mn\,at\,hyperemia}$$

In the equation "Pd at hyperemia" may correspond to the distal pressure during pharmacologically induced hyperemia. The distal pressure may be determined using the volume flow rate ("VFR"). The VFR may be determined using one or more images collected during an OCT pullback when the blood vessel is in pharmacologically induced hyperemia. The lumen geometry of the blood vessel may be determined based on the one or more images collected during the pullback. The lumen geometry may be used to determine a hyperemic distal pressure and a hyperemic aortic pressure. The distal pressure may be determined based on the volumetric lumen geometry. For example, a resistor model may be used to represent the target vessel. Based on Ohm's law, the pressure gradient (ΔP) may be equal to the flow rate (Q) multiplied be the resistance of the vessel (R), as shown in the equation below:

$$\Delta P = QR$$

Flow rate may be calculated by theoretical aortic and venous pressures through the resistor model.

In some examples, the images collected by the intravascular imaging probe and the data determined based on the images may be used to evaluate potential stent placement. For example, based on the images, the CFR, IMR, VFR, etc. may be determined. According to some examples, the determined CFR, IMR, VFR, etc. values may be used with virtual stents, landing zones, clustering-based methods, etc. to perform stent planning and other diagnostic and analytic methods.

Figure 9:
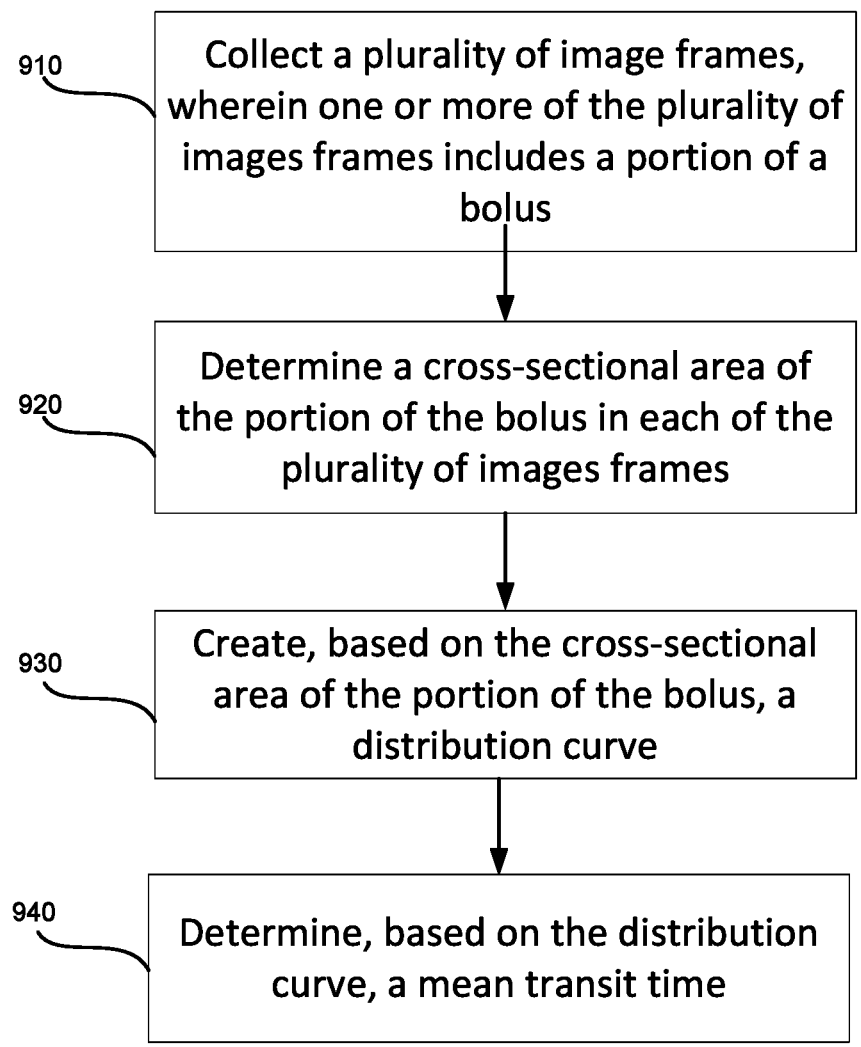
FIG. 9 is a flow diagram illustrating a method of determining mean transit time of blood within a blood vessel according to aspects of the disclosure.

FIG. 9 illustrates an example method of determining a mean transit time of a bolus within a blood vessel. The following operations do not have to be performed in the precise order described below. Rather, various operations can be handled in a different order or simultaneously, and operations may be added or omitted.

For example, in block 910, data collection system, such as system 100, may collect a plurality of image frames. The collected image frames may be stored in memory 114. The plurality of image frames may be collected when an OCT probe is held stationary in a blood vessel. One or more image frames of the plurality of image frames may include a portion of a bolus injected into the blood vessel. For example, one or more of the images frames may include a portion of the injected bolus as the bolus passes by the OCT probe.

In block 920, a cross-sectional area of the portion of the bolus in each of the plurality of image frames may be determined. Determining the cross-sectional area of the bolus may include, for example, computing a threshold using a Gaussian mixture model with two components. The threshold may be the average of the mean of each component. A vessel mask may be determined using lumen, catheter, and guidewire offsets. The vessel mask may indicate the cross-sectional area within the lumen boundary that the bolus may occupy. An element-wise AND operation may be applied between the vessel mask and the segmented image frame. The result of the element-wise AND may be a contrast mask. The contrast mask may allow for the pixel area of contrast within the image to be determined. This may be repeated for one or more images captured during when the OCT probe is held stationary in the blood vessel.

In block 930, a distribution curve is created based on the cross-sectional area of the portion of the bolus in one or more image frames. The distribution curve may be an area dilution curve.

In block 940, the mean transit time may be determined based on the distribution curve. For example, the distribution curve may be smoothed with a median filter. The peak closest to the center of the stationary image frame capture may be determined. A Gaussian fit may be applied to the smoothed distribution curve using the determined peak as the initial mean value. Areas four standard deviations away from the curve may be removed. This may prevent any artifacts, such as the previous or subsequent bolus, from being taken into account when determining the mean transit time. A log normal fit may be applied to the distribution curve. The initial time "T0" may be determined based on the first increase in the cross sectional area in the distribution curve. The mean transit time may be determined based on the initial time and the log normal fit curve.

Using an OCT probe to determine the mean transit time may provide the advantage that no additional hardware or sensors have to be used. For example, using the OCT probe to collect image frames and using the image frames to determine the mean transit time may eliminate the need to insert a pressure wire. This may reduce the risk of complication during the procedure. Additionally or alternatively, using the OCT probe to determine the mean transit time may allow for real time readings of the mean transit time. In some examples, the mean transit time determined using the OCT system may be used to determine coronary flow reserve ("CFR") data and/or determine IMR data. Thus, the OCT probe may be used to determine physiology information as well as anatomical information.

According to the techniques described herein, a method of determining mean transit time may comprise storing intravascular data for a blood vessel in a memory device, the intravascular data comprising a plurality of image frames collected by one or more processors coupled to an intravascular imaging probe at a location within the blood vessel, wherein each of the plurality of image frames includes a portion of a bolus injected into the blood vessel, determining, by the one or more processors, a cross-sectional area of the portion of the bolus in each of the plurality of image frames, creating, by the one or more processors based on the determined cross-sectional area of the portion of the bolus in each of the plurality of image frames, a distribution curve, and determining, by the one or more processors based on the distribution curve, a mean transit time of blood within the blood vessel. Determining the mean transit time may further include integrating, by the one or more processors, the distribution curve.

Determining the cross-sectional area of the portion of the bolus may include segmenting, by the one or more processors, each of the plurality of image frames by thresholding, determining, by the one or more processors, a vessel mask for each of the plurality of images frames, wherein the determining is based on at least one of a lumen offset, a catheter offset, or a guidewire offset, and determining, by the one or more processors based on each of the plurality of segmented image frames and the vessel mask for each of the plurality of image frames, a contrast mask. The pixel area of the contrast mask for each of the plurality of frames may correspond to the cross-sectional area of the portion of the bolus. Segmenting each of the plurality of image frames by threshold may include at least one of computing, by the one or more processors, a Gaussian mixture model, comparing, by the one or more processors, each of the one or more image frames to a predetermined threshold, or applying, by the one or more processors, Otsu thresholding.

The method may further include smoothing, by the one or more processors, the distribution curve using a median filter, determining, by the one or more processors, a peak of the smoothed distribution curve, applying, by the one or more processors to the smoothed distribution curve, a Gaussian fit, determining, by the one or more processors, a zero value four standard deviations outside of the Gaussian fit, and applying, by the one or more processors to the applied Gaussian fit based on the zero value, a log normal fit. An initial time the bolus reached the intravascular imaging probe may be determined by identifying a first image frame of the plurality of image frames having at least a portion of the bolus. The initial time and the applied log normal fit may be used to determine the mean transit time.

Another aspect of the techniques disclosed herein may include a system comprising an intravascular imaging probe and one or more processors in communication with the intravascular imaging probe. The one or more processors may be configured to collect a plurality of image frames at a location within a blood vessel, wherein each of the plurality of image frames includes a portion of a bolus injected into the blood vessel, determine a cross-sectional area of the portion of the bolus in each of the plurality of image frames, create, based on the determined cross-sectional area of the portion of the bolus in each of the plurality of image frames, a distribution curve, and determine, based on the distribution curve, a mean transit time of blood within the blood vessel.

Yet another aspect of the techniques disclosed herein may include a non-transitory computer-readable medium storing instructions, which when executed by one or more processors, cause the one or more processors to receive a plurality of image frames at a location within a blood vessel from an intravascular imaging probe, wherein each of the plurality of image frames includes a portion of a bolus injected into the blood vessel, determine a cross-sectional area of the portion of the bolus in each of the plurality of image frames, create, based on the determined cross-sectional area of the portion of the bolus in each of the plurality of image frames, a distribution curve, and determine, based on the distribution curve, a mean transit time of blood within the blood vessel.

The mean transit time of blood within a blood vessel may be determined based on intravascular imaging data. A CFR value and/or an IMR value may be determined based on the determined mean transit time. According to some examples, the CFR value and/or IMR value may be used to identify one or more aspects of microvascular disease within the blood vessel in combination with one or more additional factors.

The aspects, embodiments, features, and examples of the disclosure are to be considered illustrative in all respects and are not intended to limit the disclosure, the scope of which is defined only by the claims. Other embodiments, modifications, and usages will be apparent to those skilled in the art without departing from the spirit and scope of the claimed invention.

Throughout the application, where compositions are described as having, including, or comprising specific components, or where processes are described as having, including or comprising specific process steps, it is contemplated that compositions of the present teachings also consist essentially of, or consist of, the recited components, and that the processes of the present teachings also consist essentially of, or consist of, the recited process steps.

In the application, where an element or component is said to be included in and/or selected from a list of recited elements or components, it should be understood that the element or component can be any one of the recited elements or components and can be selected from a group consisting of two or more of the recited elements or components. Further, it should be understood that elements and/or features of a composition, an apparatus, or a method described herein can be combined in a variety of ways without departing from the spirit and scope of the present teachings, whether explicit or implicit herein.

The use of the terms "include," "includes," "including," "have," "has," or "having" should be generally understood as open-ended and non-limiting unless specifically stated otherwise.

The use of the singular herein includes the plural (and vice versa) unless specifically stated otherwise. Moreover, the singular forms "a," "an," and "the" include plural forms unless the context clearly dictates otherwise. In addition, where the use of the term "about" is before a quantitative value, the present teachings also include the specific quantitative value itself, unless specifically stated otherwise. As used herein, the term "about" refers to a ±10% variation from the nominal value. All numerical values and ranges disclosed herein are deemed to include "about" before each value.

It should be understood that the order of steps or order for performing certain actions is immaterial so long as the present teachings remain operable. Moreover, two or more steps or actions may be conducted simultaneously.

Where a range or list of values is provided, each intervening value between the upper and lower limits of that range or list of values is individually contemplated and is encompassed within the invention as if each value were specifically enumerated herein. In addition, smaller ranges between and including the upper and lower limits of a given range are contemplated and encompassed within the invention. The listing of exemplary values or ranges is not a disclaimer of other values or ranges between and including the upper and lower limits of a given range.

The invention claimed is:

1. A method of determining a mean transit time of a bolus within a blood vessel to be used for diagnosing microvascular disease, comprising:
   receiving, by one or more processors coupled to an intravascular imaging probe, intravascular imaging data comprising a plurality of image frames collected by the intravascular imaging probe at a location within the blood vessel, wherein the bolus passes the intravascular imaging probe at the location;
   determining, by the one or more processors, a cross-sectional area of a portion of the bolus in the plurality of image frames including at least the portion of the bolus;
   creating, by the one or more processors based on the determined cross-sectional area of the portion of the bolus in the plurality of image frames including at least the portion of the bolus, a distribution curve;
   determining, by the one or more processors based on the plurality of image frames including at least the portion of the bolus, a mean transit time of the bolus within the blood vessel;
   determining, by the one or more processors based on the determined mean transit time, at least one of a coronary flow reserve ("CFR") value or an index of microcirculatory resistance ("IMR") value; and
   providing for output, by the one or more processors, the determined at least one of the CFR value or the IMR value.

2. The method of claim 1, wherein the intravascular imaging data is optical coherence tomography ("OCT") imaging data, intravascular ultrasound imaging data, micro-OCT imaging data, or near infrared spectroscopy imaging data.

3. The method of claim 1, wherein determining the mean transit time of blood within the blood vessel is further based on the distribution curve.

4. The method of claim 1, wherein determining the mean transit time further includes integrating, by the one or more processors, the distribution curve.

5. The method of claim 1, wherein determining the cross-sectional area of the portion of the bolus includes:
   segmenting, by the one or more processors, the plurality of image frames including at least the portion of the bolus by thresholding;
   determining, by the one or more processors, a vessel mask for the plurality of images frames including at least the portion of the bolus, wherein the determining is based on at least one of a lumen offset, a catheter offset, or a guidewire offset; and determining, by the one or more processors based on each of the plurality of segmented image frames and the vessel mask for each of the plurality of image frames, a contrast mask.

6. The method of claim 5, wherein a pixel area of the contrast mask for the plurality of image frames including at least the portion of the bolus corresponds to the cross-sectional area of the portion of the bolus.

7. The method of claim 5, wherein segmenting the plurality of image frames by thresholding includes at least one of:
computing, by the one or more processors, a Gaussian mixture model,
comparing, by the one or more processors, each of the plurality of image frames to a predetermined threshold, or
applying, by the one or more processors, Otsu thresholding.

8. A system for diagnosing microvascular disease, comprising:
an intravascular imaging probe; and
one or more processors in communication with the intravascular imaging probe, the one or more processors configured to:
receive, from the intravascular imaging probe, a plurality of intravascular image frames at a location within a blood vessel, wherein the location corresponds to where a bolus passes the intravascular imaging probe;
determine a cross-sectional area of a portion of the bolus in the plurality of intravascular image frames including at least the portion of the bolus;
create, based on the determined cross-sectional area of the portion of the bolus in the plurality of intravascular image frames including at least the portion of the bolus, a distribution curve;
determine, based on the plurality of intravascular image frames including at least the portion of the bolus, a mean transit time of the bolus within the blood vessel;
determine, based on the determined mean transit time, at least one of a coronary flow reserve ("CFR") value or an index of microcirculatory resistance ("IMR") value; and
provide for output the determined at least one of the CFR value or the IMR value.

9. The system of claim 8, wherein the intravascular image frames comprise optical coherence tomography ("OCT") imaging data, intravascular ultrasound imaging data, micro-OCT imaging data, or near infrared spectroscopy imaging data.

10. The system of claim 8, wherein determining the mean transit time of blood within the blood vessel is further based on the distribution curve.

11. The system of claim 8, wherein when determining the mean transit time, the one or more processors are further configured to integrate the distribution curve.

12. The system of claim 8, wherein when determining the cross-sectional area of the portion of the bolus, the one or more processors are configured to:
segment the plurality of intravascular image frames including at least the portion of the bolus by thresholding;
determine a vessel mask for the plurality of intravascular image frames including at least the portion of the bolus, wherein the determining is based on at least one of a lumen offset, a catheter offset, or a guidewire offset; and
determine, based on each of the plurality of segmented image frames and the vessel mask for each of the plurality of intravascular image frames, a contrast mask.

13. The system of claim 12, wherein a pixel area of the contrast mask for the plurality of intravascular image frames including at least the portion of the bolus corresponds to the cross-sectional area of the portion of the bolus.

14. A non-transitory computer-readable medium storing instructions for diagnosing microvascular disease, which when executed by one or more processors, cause the one or more processors to:
receive a plurality of intravascular image frames at a location within a blood vessel from an intravascular imaging probe, wherein the location corresponds to where a bolus passes the intravascular imaging probe;
determine a cross-sectional area of a portion of the bolus in the plurality of intravascular image frames including at least the portion of the bolus;
create, based on the determined cross-sectional area of the portion of the bolus in the plurality of intravascular image frames including at least the portion of the bolus, a distribution curve;
determine, based on the plurality of intravascular image frames including at least the portion of the bolus, a mean transit time of the bolus within the blood vessel;
determine, based on the determined mean transit time, at least one of a coronary flow reserve ("CFR") value or an index of microcirculatory resistance ("IMR") value; and
provide for output the determined at least one of the CFR value or the IMR value.

* * * * *